United States Patent
Park et al.

(10) Patent No.: US 11,982,827 B2
(45) Date of Patent: May 14, 2024

(54) DIFFRACTION LIGHT GUIDE PLATE AND DISPLAY DEVICE INCLUDING THE SAME

(71) Applicant: LG CHEM, LTD., Seoul (KR)

(72) Inventors: Jeong Ho Park, Daejeon (KR); Seong Min Park, Daejeon (KR); Sang Choll Han, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1009 days.

(21) Appl. No.: 16/771,552

(22) PCT Filed: Jan. 14, 2019

(86) PCT No.: PCT/KR2019/000548
§ 371 (c)(1),
(2) Date: Jun. 10, 2020

(87) PCT Pub. No.: WO2019/139440
PCT Pub. Date: Jul. 18, 2019

(65) Prior Publication Data
US 2023/0204843 A1    Jun. 29, 2023

(30) Foreign Application Priority Data

Jan. 12, 2018  (KR) .......... 10-2018-0004481
Jan. 12, 2018  (KR) .......... 10-2018-0004482
Jan. 12, 2018  (KR) .......... 10-2018-0004483

(51) Int. Cl.
*F21V 8/00*      (2006.01)
*G02B 27/01*    (2006.01)
*G02B 27/42*    (2006.01)

(52) U.S. Cl.
CPC ....... *G02B 6/0016* (2013.01); *G02B 27/0172* (2013.01); *G02B 27/4205* (2013.01); *G02B 2027/0178* (2013.01); *G02B 2207/117* (2013.01)

(58) Field of Classification Search
CPC ... G02B 2027/0105–0198; G02B 27/01–0189; G02B 6/0016
See application file for complete search history.

(56) References Cited

U.S. PATENT DOCUMENTS 6,580,529 B1   6/2003  Amitai et al.
8,508,848 B2   8/2013  Saarikko
(Continued)

FOREIGN PATENT DOCUMENTS

CN   101688977 A    3/2010
EP     1068548 A    1/2001
(Continued)

OTHER PUBLICATIONS

Office Action of Japanese Patent Office in Appl'n No. 2020-552658, dated Jul. 5, 2021.

*Primary Examiner* — Bao-Luan Q Le
*Assistant Examiner* — Christopher A Lamb, II
(74) *Attorney, Agent, or Firm* — Bryan Cave Leighton Paisner LLP

(57) ABSTRACT

The present disclosure provides a diffraction light guide plate, including a light guide unit, an input diffraction optical device configured to receive light from a light source and diffract the received light, an intermediate diffraction optical device configured to receive the diffracted light from the input diffraction optical device and extend the received light one-dimensionally by diffraction, and an output diffraction optical device configured to receive the extended light from the intermediate diffraction optical device and output the received light from the light guide unit by diffraction. The (Continued)

intermediate diffraction optical device and the output diffraction optical device are separately disposed in regions divided horizontally on the light guide unit, and the intermediate diffraction optical device includes a main intermediate diffraction optical device and an auxiliary intermediate diffraction optical device, which are disposed separate apart from each other vertically on the light guide unit.

12 Claims, 15 Drawing Sheets

(56)  References Cited

U.S. PATENT DOCUMENTS

| | | | |
|---|---|---|---|
| 2010/0214659 A1* | 8/2010 | Levola | G02B 6/0035 |
| | | | 359/566 |
| 2010/0277803 A1 | 11/2010 | Pockett et al. | |
| 2016/0327705 A1* | 11/2016 | Simmonds | G02B 27/0172 |
| 2017/0123208 A1 | 5/2017 | Vallius | |
| 2017/0139210 A1* | 5/2017 | Vallius | G02B 6/0026 |
| 2017/0329132 A1 | 11/2017 | Mason | |

FOREIGN PATENT DOCUMENTS

| | | | |
|---|---|---|---|
| JP | 2008-523435 A | 7/2008 |
| JP | 2008523435 A | 7/2008 |
| JP | 2016105177 A | 6/2016 |
| JP | 2007-219106 A | 8/2019 |
| KR | 10-2015-0122341 A | 11/2015 |
| KR | 10-2016-0101104 A | 8/2016 |
| KR | 10-2017-0039655 A | 4/2017 |
| WO | 9952002 A1 | 10/1999 |
| WO | 2008148927 A1 | 12/2008 |

* cited by examiner (a)

(b)

DIFFRACTION LIGHT GUIDE PLATE AND DISPLAY DEVICE INCLUDING THE SAME

TECHNICAL FIELD

The present invention relates to a diffraction light guide plate and a display device including the same.

BACKGROUND ART

Recently, as interests in a display unit implementing Augmented Reality (AR), Mixed Reality (MR), or Virtual Reality (VR) are increased, research on a display unit implementing AR, MR, or VR is actively progressed. The display unit implementing the AR, the MR, or the VR includes a diffraction light guide plate using a diffraction phenomenon based on a wave property of light.

The diffraction light guide plate may include a light guide unit, and a plurality of diffraction optical devices, which is provided on one surface or the other surface of the light guide unit and has a plurality of grating line patterns. Particularly, the diffraction light guide plate may include a first diffraction optical device, to which light output through a micro light source output device is input to be guided to a light guide unit, a second diffraction optical device, which is optically coupled to the first diffraction optical device through the light guide unit, and allows the light received from the first optical device to be one-dimensionally extended in a first direction by diffraction, and a third diffraction optical device, which is optically coupled to the second diffraction optical device through the light guide unit, and allows the light received from the second diffraction optical device to be output from the light guide unit while being one-dimensionally extended in a second direction by diffraction and to head a pupil of a user.

FIG. 1A is a diagram schematically illustrating a diffraction light guide plate according to an example of a related art, and FIG. 1B is a diagram schematically illustrating a display device including the diffraction light guide plate illustrated in FIG. 1A.

Referring to FIG. 1A, a diffraction light guide plate 10 according to an example of a related art may have a structure, in which a first diffraction optical device 12 is disposed at one side of a light guide unit 11, a second diffraction optical device 13 has the form elongated in a horizontal direction (a y-axis direction in FIG. 1) heading from one side to the other side of the light guide unit 11 as a main direction and is disposed on the light guide unit 11, and a third diffraction optical device 14 is disposed on the light guide unit 11 while being spaced apart in a vertical direction (an x-axis direction in FIG. 1) from the second diffraction optical device 13 as a main direction. That is, a path, in which the first diffraction optical device 12, the second diffraction optical device 13, and the third diffraction optical device 14 are disposed, on the light guide unit 11 may generally have a structure in the form of "¬".

In the meantime, in the case where a first direction, in which light is one-dimensionally extended by diffraction in the second diffraction optical device 13 is the horizontal direction as the main direction and the path, in which the diffraction optical devices are disposed, is in the form of "¬", when the second diffraction optical device 13 directly diffracts light, which moves and is received from the first diffraction optical device 12 in the horizontal direction as the main direction, in the vertical direction as the main direction, the diffracted light may be directed to the third diffraction optical device 14.

That is, in the structure, the light may be directed to the third diffraction optical device 14 only by diffracting, by the second diffraction optical device 13, the light received from the first diffraction optical device 12 by the odd number of times (the number N of times of the diffraction for directing the light to the third diffraction optical device is 2n−1, n is the number of times of the diffraction of the light in the x-axis direction). In the meantime, the diffraction and the total reflection repeatedly occur in the form in which a part of the light received through the second diffraction optical device 13 is diffracted and the remaining light is totally reflected, and a part of the remaining light is diffracted and the remaining light is totally reflected. Accordingly, when the diffraction, in which a light movement path is changed to a progress direction of the total reflection, is performed several times, the amount of light is gradually decreased in the progress direction of the total reflection. Accordingly, there is an advantage in that it is possible to easily achieve the uniform amount of light extended by diffraction from the second diffraction optical device 13 only by gradually increasing a diffraction ratio (a value obtained by dividing the amount of diffracted light by the amount of light before the diffraction) in the horizontal direction that is the extension direction of the second diffraction optical device 13.

A phenomenon, in which a rainbow pattern is generated due to interference by external light to image light, which is diffracted and totally reflected, may be generated in a predetermined region of the light guide unit 11, in which the second diffraction optical device 13 is disposed, and in order to prevent the phenomenon, it is necessary to provide a reducing layer for reducing a light reception ratio of the external light received in the predetermined region of the light guide unit 11, in which the second diffraction optical device 13 is disposed.

In the meantime, in the diffraction light guide plate 10 according to the example of the related art, the second diffraction optical device 13 and the third diffraction optical device 14 are separately disposed in regions A and B divided in the vertical direction, and particularly, the second diffraction optical device 13 is disposed in an upper region A between the divided regions in the vertical direction and the third diffraction optical device 14 is disposed in a lower region B between the divided regions in the vertical direction. In this case, the second diffraction optical device 13 is elongated in the horizontal direction as the main direction, so that when the reducing layer 15 is provided on the predetermined region of the light guide unit 11, in which the second diffraction optical device 13 is disposed, the reducing layer 15 occupies a considerable portion of the upper region of a lens, to which the diffraction light guide plate 10 is applicable, like the display device illustrated in FIG. 1B, so that there is a disadvantage in that an exterior appearance is poor.

FIG. 2 is a diagram schematically illustrating a diffraction light guide plate according to another example of the related art.

Referring to FIG. 2, a diffraction light guide plate 20 according to another example of the related art may have a structure, in which a first diffraction optical device 22 is disposed at one side of a light guide unit 21, a second diffraction optical device 23 has a form elongated in a vertical direction (an x-axis direction in FIG. 2) heading from an upper side to a lower side of the light guide unit 21 as a main direction and is disposed on the light guide unit 21, and a third diffraction optical device 24 is disposed on the light guide unit 21 separate apart in a horizontal direction (a y-axis direction in FIG. 2) from a lower end of the second diffraction optical device 23 as a main direction. That is, a path, in which the first diffraction optical device 22, the second diffraction optical device 23, and the third diffraction optical device 24 are disposed, on the light guide unit 21 may have a structure generally in the form of "⌐".

In the meantime, as a first direction, in which light is one-dimensionally extended by diffraction in the second diffraction optical device 23, is the vertical direction as the main direction, when the path in which the diffraction optical devices are disposed is in the form of "⌐", the second diffraction optical device 23 essentially needs to diffract the light which moved and received from the first diffraction optical device 22 in the horizontal direction as the main direction, in the vertical direction as the main direction. Further, only when the light diffracted in the vertical direction as the main direction is diffracted in the horizontal direction as the main direction again, the diffracted light may be directed to the third diffraction optical device 24.

That is, in the structure, the light may be directed to the third diffraction optical device 24 only by diffracting, by the second diffraction optical device 23, the light received from the first diffraction optical device 22 by the even number of times (the number N of times of the diffraction for directing the light to the third diffraction optical device is 2n, n is the number of times of the diffraction of the light in the x-axis or y-axis direction).

In the meantime, when the diffraction, in which the light movement path is changed to the progress direction of the total reflection, is performed several times, the amount of light is gradually decreased in the progress direction of the total reflection, and in order to make the amount of light, which is one-dimensionally extended by the even number of times of the diffraction by the second diffraction optical device 23, be uniform, it is necessary to basically accompany constructive interference with more light than that of the case by the odd number of times of the diffraction, so that it is necessary to form the second diffraction optical device 23 to have a wide width in the horizontal direction as the main direction. However, a grating line pattern of the second diffraction optical device 23 may be deviated little by little from the intended total reflection path on the light guide unit 21. When the second diffraction optical device 23 is elongated in the vertical direction as the main direction and is formed to have a wide width in the horizontal direction as the main direction, the total reflected and moving light meets the grating line pattern more often, so that there is a possibility in that the light path, in which the light is refracted and totally reflected, is differently formed from an initially designed light path, and this causes a problem in that a quality of image light output through the third diffraction optical device 34 is degraded.

The background art are technical information, which the inventors may have for deriving the exemplary embodiments of the present invention or acquired during the derivation process, and it cannot be said that the background art is a publicly known technology published to the general public before the exemplary embodiments of the present invention are filed.

DISCLOSURE

Technical Problem

The present invention aims to provide a diffraction light guide plate, which has a structure, in which a diffraction optical device, which one-dimensionally extends image light forming an image on a light guide unit, and a diffraction optical device, which outputs the extended image light from the light guide unit, are spaced apart from each other in a horizontal direction on the light guide unit, thereby preventing an image quality from being degraded, and a display device including the diffraction light guide plate.

An object to be solved in the present invention is not limited to the aforementioned objects, and other objects non-mentioned herein will be clearly understood by those skilled in the art from descriptions below.

Technical Solution

An exemplary embodiment according to one aspect of the present invention provides a diffraction light guide plate, including: a light guide unit configured to guide light; an input diffraction optical device configured to receive light from a light source and diffract the received light so that the received light is guided on the light guide unit; an intermediate diffraction optical device configured to receive the diffracted light from the input diffraction optical device and allow the received light to be one-dimensionally extended by diffraction; and an output diffraction optical device configured to receive the extended light from the intermediate diffraction optical device and allow the received light to be output from the light guide unit by diffraction, in which the intermediate diffraction optical device and the output diffraction optical device are separately disposed in regions divided horizontally on the light guide unit, the intermediate diffraction optical device includes a main intermediate diffraction optical device and an auxiliary intermediate diffraction optical device, which are disposed while being spaced apart from each other in a vertical direction on the light guide unit, the main intermediate diffraction optical device is optically coupled to the input diffraction optical device through the light guide unit and directs the diffracted light received from the input diffraction optical device to the auxiliary intermediate diffraction optical device by diffraction, and the auxiliary intermediate diffraction optical device is optically coupled to the main intermediate diffraction optical device through the light guide unit and directs the diffracted light received from the main intermediate diffraction optical device to the output diffraction optical device by diffraction.

In the exemplary embodiment, an extension direction of the auxiliary intermediate diffraction optical device may be inclined to an extension direction of the main intermediate diffraction optical device.

In the exemplary embodiment, the main intermediate diffraction optical device may have a diffraction ratio gradually increasing from one side to the other side in the extension direction of the main intermediate diffraction optical device.

In the exemplary embodiment, the auxiliary intermediate diffraction optical device may have the same diffraction ratio from one side to the other side in the extension direction of the auxiliary intermediate diffraction optical device.

In the exemplary embodiment, the diffraction ratio of the auxiliary intermediate diffraction optical device may be larger than a maximum diffraction ratio of the main intermediate diffraction optical device.

In the exemplary embodiment, the intermediate diffraction optical device may be disposed at one surface side of the light guide unit, and a reducing unit for reducing a reception ratio of external light, other than the light output from the light source, may be disposed in a region corresponding to a region, in which the intermediate diffraction optical device is positioned, at one surface side or the other surface side of the light guide unit.

In the exemplary embodiment, a plurality of auxiliary intermediate diffraction optical devices may be provided so as to be disposed while being spaced apart from each other in a vertical direction on the light guide unit, and a first auxiliary intermediate diffraction optical device, which is adjacently disposed to the main intermediate diffraction optical device between the plurality of auxiliary intermediate diffraction optical devices, may be optically coupled to the main intermediate diffraction optical device through the light guide unit and direct the diffracted light received from the main intermediate diffraction optical device to the output diffraction optical device by diffraction, and a second auxiliary intermediate diffraction optical device, which is adjacently disposed to the first auxiliary intermediate diffraction optical device, may be optically coupled to the first auxiliary intermediate diffraction optical device through the light guide unit, and receive light, which is not diffracted to the output diffraction optical device, by the first auxiliary intermediate diffraction optical device and direct the received light to the output diffraction optical device by diffraction.

In the exemplary embodiment, a diffraction ratio of the second auxiliary intermediate diffraction optical device may be larger than a diffraction ratio of the first auxiliary intermediate diffraction optical device.

In the exemplary embodiment, a plurality of auxiliary intermediate diffraction optical devices may be provided so as to be disposed while being spaced apart from each other in a vertical direction on the light guide unit, and a first auxiliary intermediate diffraction optical device, which is adjacently disposed to the main intermediate diffraction optical device between the plurality of auxiliary intermediate diffraction optical devices, may be optically coupled to the main intermediate diffraction optical device through the light guide unit, and receive a part of the diffracted light from the main intermediate diffraction optical device and direct the received part of the diffracted light to the output diffraction optical device by diffraction, and a second auxiliary intermediate diffraction optical device, which is adjacently disposed to the first auxiliary intermediate diffraction optical device, may be optically coupled to the main intermediate diffraction optical device through the light guide unit, and receive at least a part of the diffracted light, which is not received by the first auxiliary intermediate diffraction optical device, from the main intermediate diffraction optical device, and direct the received light to the output diffraction optical device by diffraction.

In the exemplary embodiment, a width of the second auxiliary intermediate diffraction optical device in a direction crossing the extension direction of the second auxiliary intermediate diffraction optical device may be larger than a width of the first auxiliary intermediate diffraction optical device.

In the exemplary embodiment, the extension direction of the first auxiliary intermediate diffraction optical device may be parallel to the extension direction of the second auxiliary intermediate diffraction optical device.

An exemplary embodiment according to another aspect of the present invention provides a display device, including: a light source configured to output image light forming an image; and the diffraction light guide plate according to one aspect of the present invention.

Advantageous Effects

According to the exemplary embodiment of the present invention, the present invention has a structure, in which an intermediate diffraction optical device, which one-dimensionally extends image light forming an image on a light guide unit, and an output diffraction optical device, which outputs the extended image light from the light guide unit, are disposed separate apart from each other in a horizontal direction on the light guide unit, and the intermediate diffraction optical device has a structure including a main intermediate diffraction optical device and an auxiliary intermediate diffraction optical device, which are disposed while being spaced apart from each other in a vertical direction on the light guide unit, thereby preventing an image quality from being degraded.

Figure 5:
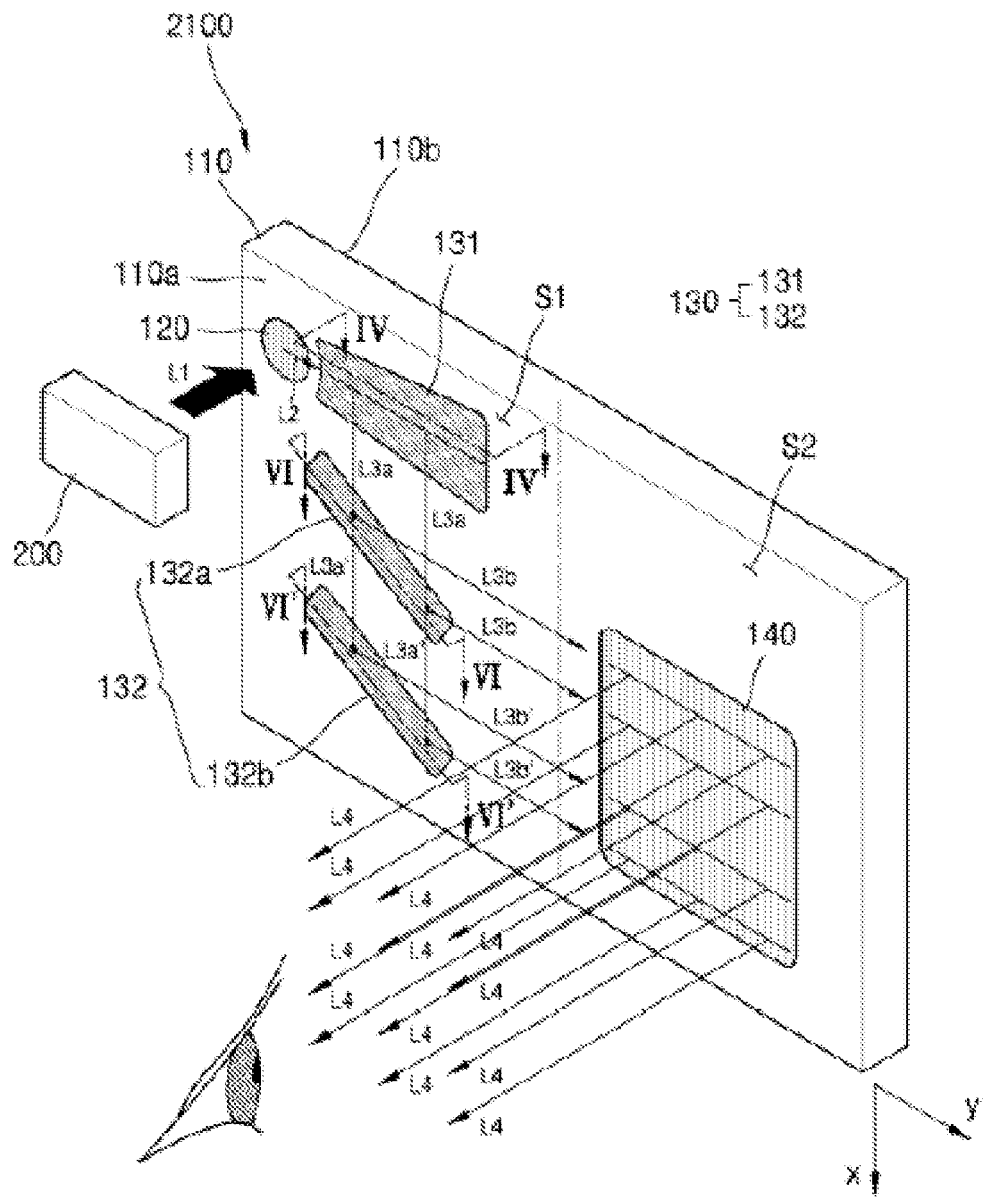
FIG. 5 is a diagram schematically illustrating a second exemplary embodiment of a diffraction light guide plate according to one aspect of the present invention.
Figure 6:
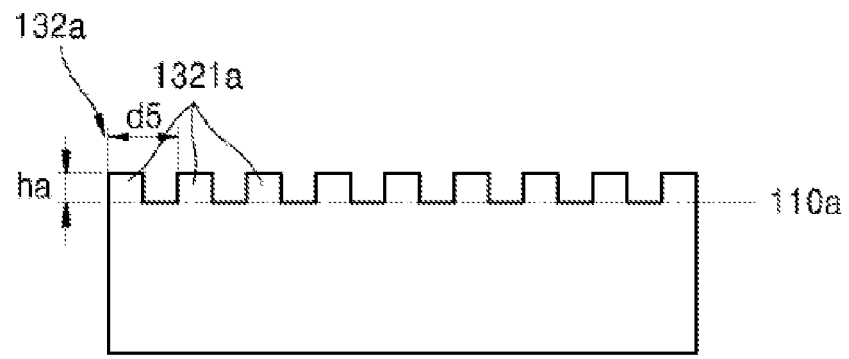
Figure 6:
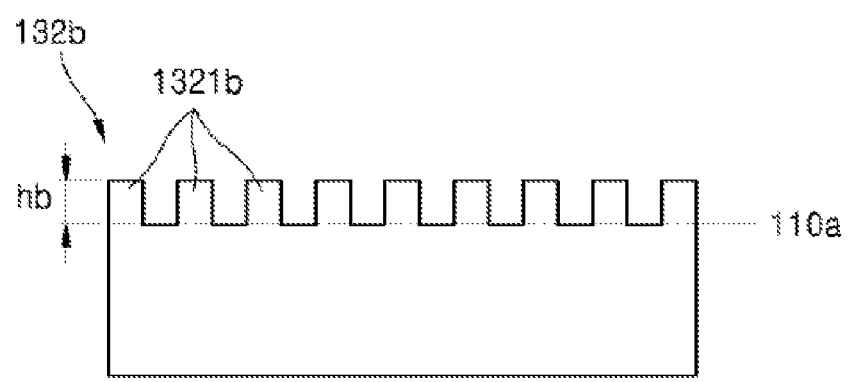

(a) of FIG. 6 is a cross-sectional diagram taken along line VI-VI of FIG. 5 and (b) of FIG. 6 is a cross-sectional diagram taken along line VI'-VI' of FIG. 5, and are diagrams illustrating an exemplary embodiment, in which diffraction ratios a first auxiliary intermediate diffraction optical device and a second auxiliary intermediate diffraction optical device are different.

Figure 7:
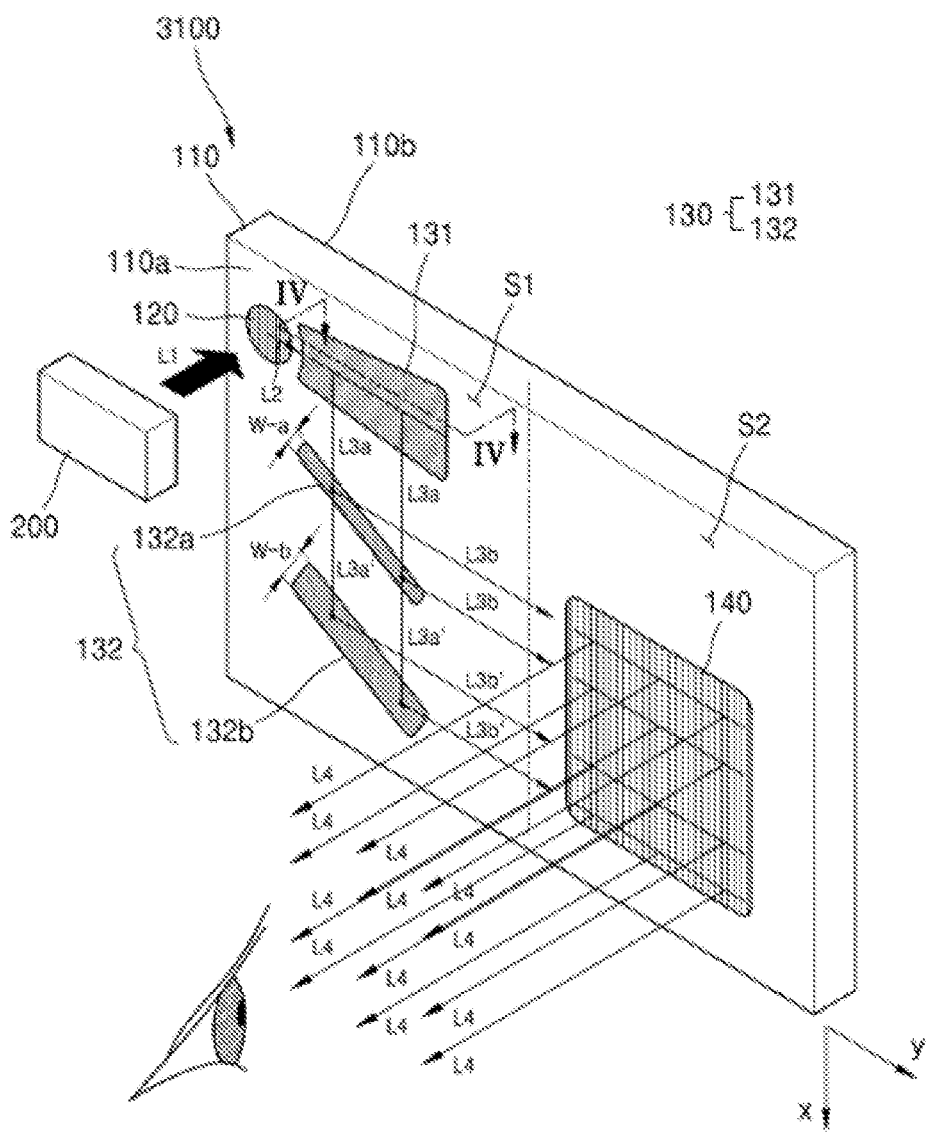

FIG. 7 is a diagram schematically illustrating a third exemplary embodiment of a diffraction light guide plate according to one aspect of the present invention.

Figure 8:
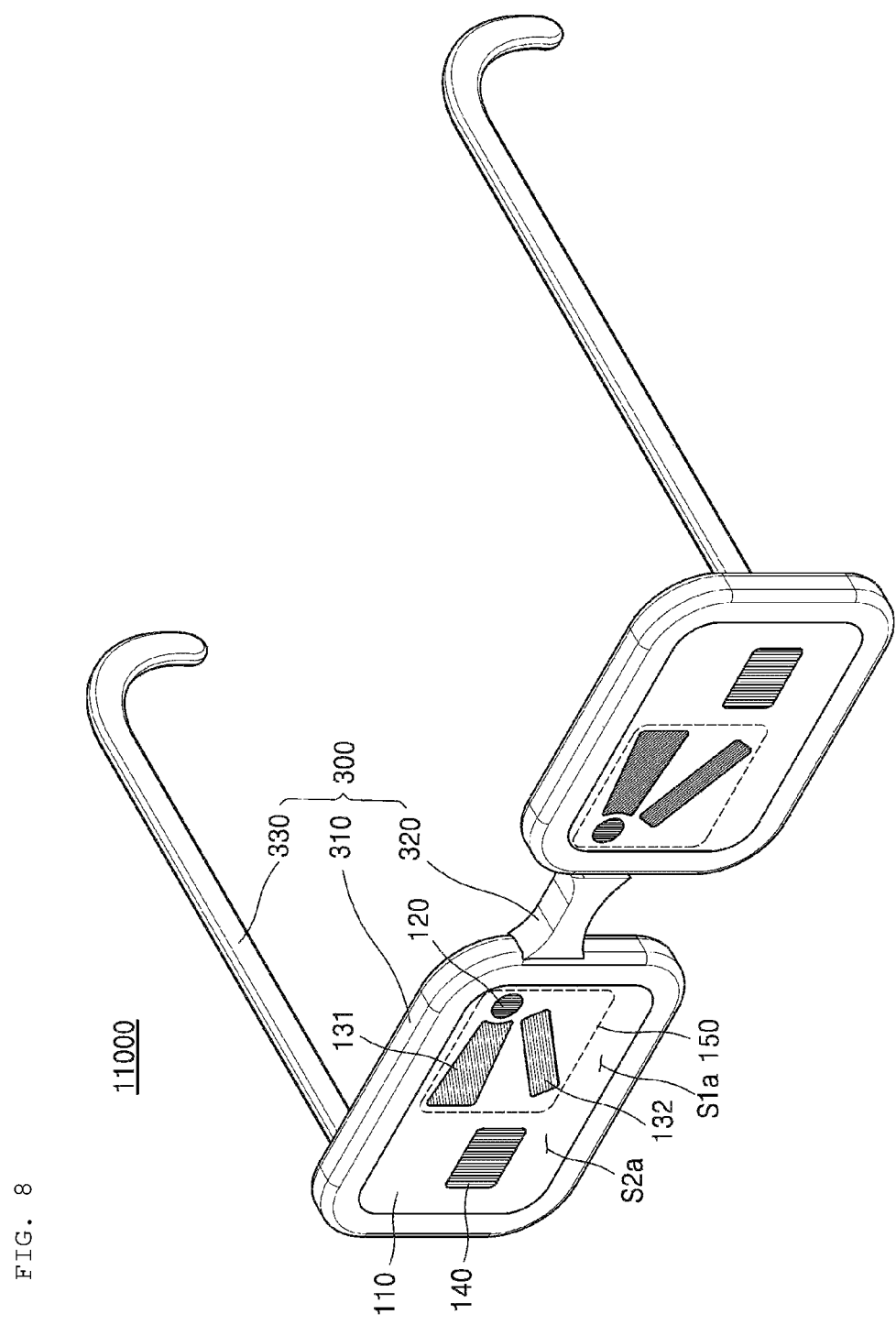

FIG. 8 is a diagram schematically illustrating one form of a first exemplary embodiment of a display device according to another aspect of the present invention.

Figure 9:
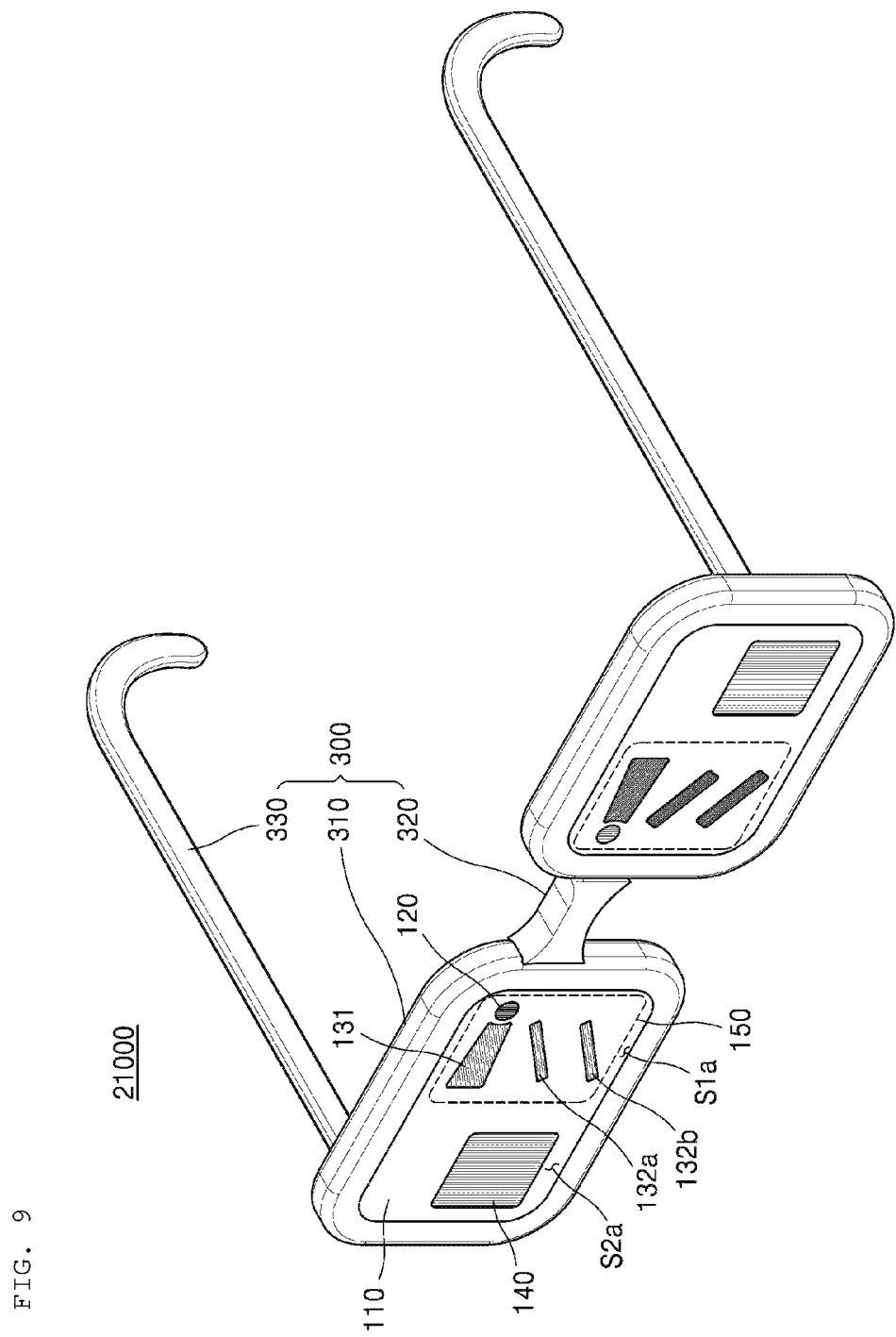

FIG. 9 is a diagram schematically illustrating one form of a second exemplary embodiment of a display device according to another aspect of the present invention.

Figure 10:
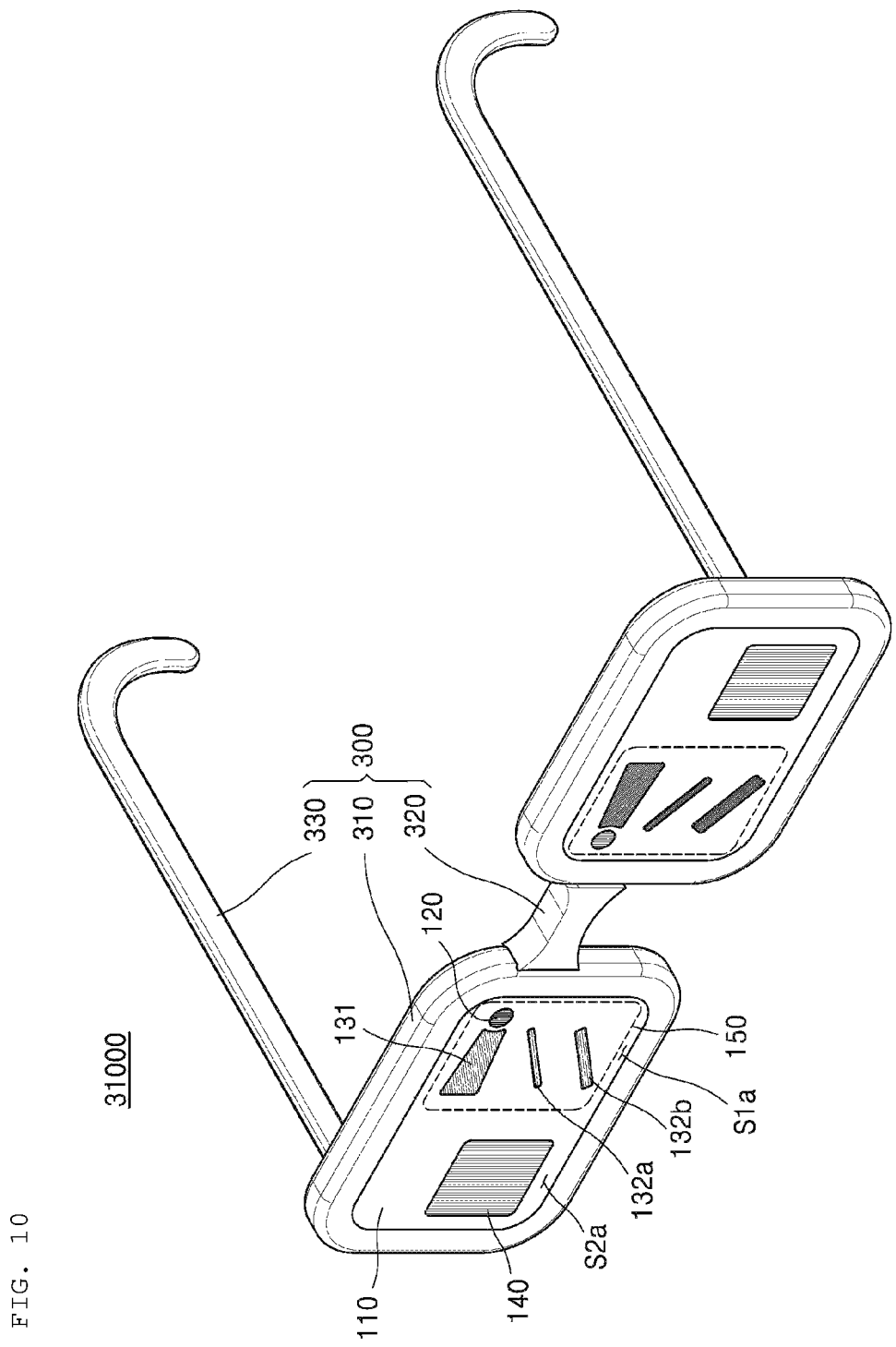

FIG. 10 is a diagram schematically illustrating one form of a third exemplary embodiment of a display device according to another aspect of the present invention.

Figure 11:
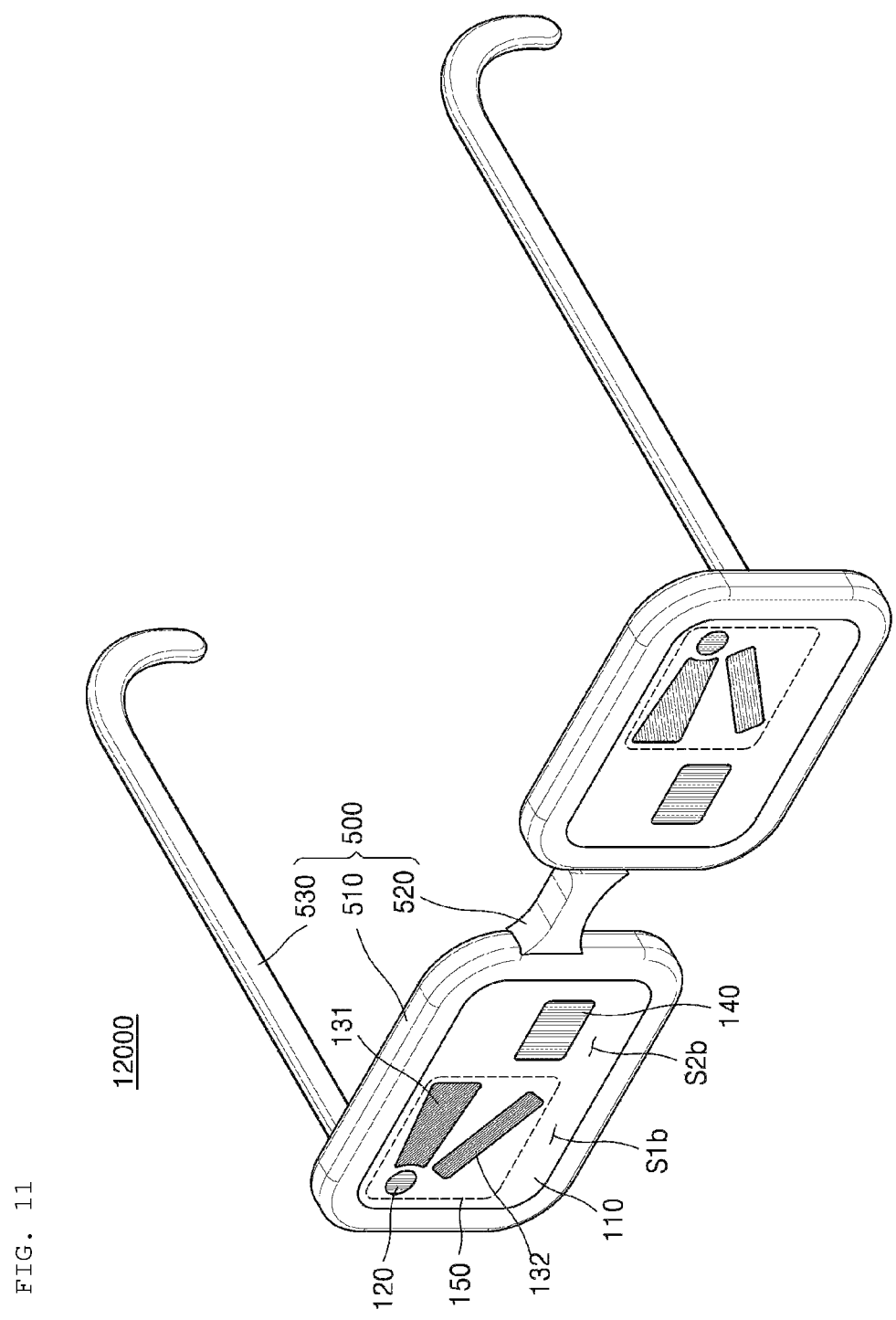

FIG. 11 is a diagram schematically illustrating another form of the first exemplary embodiment of the display device according to another aspect of the present invention.

Figure 12:
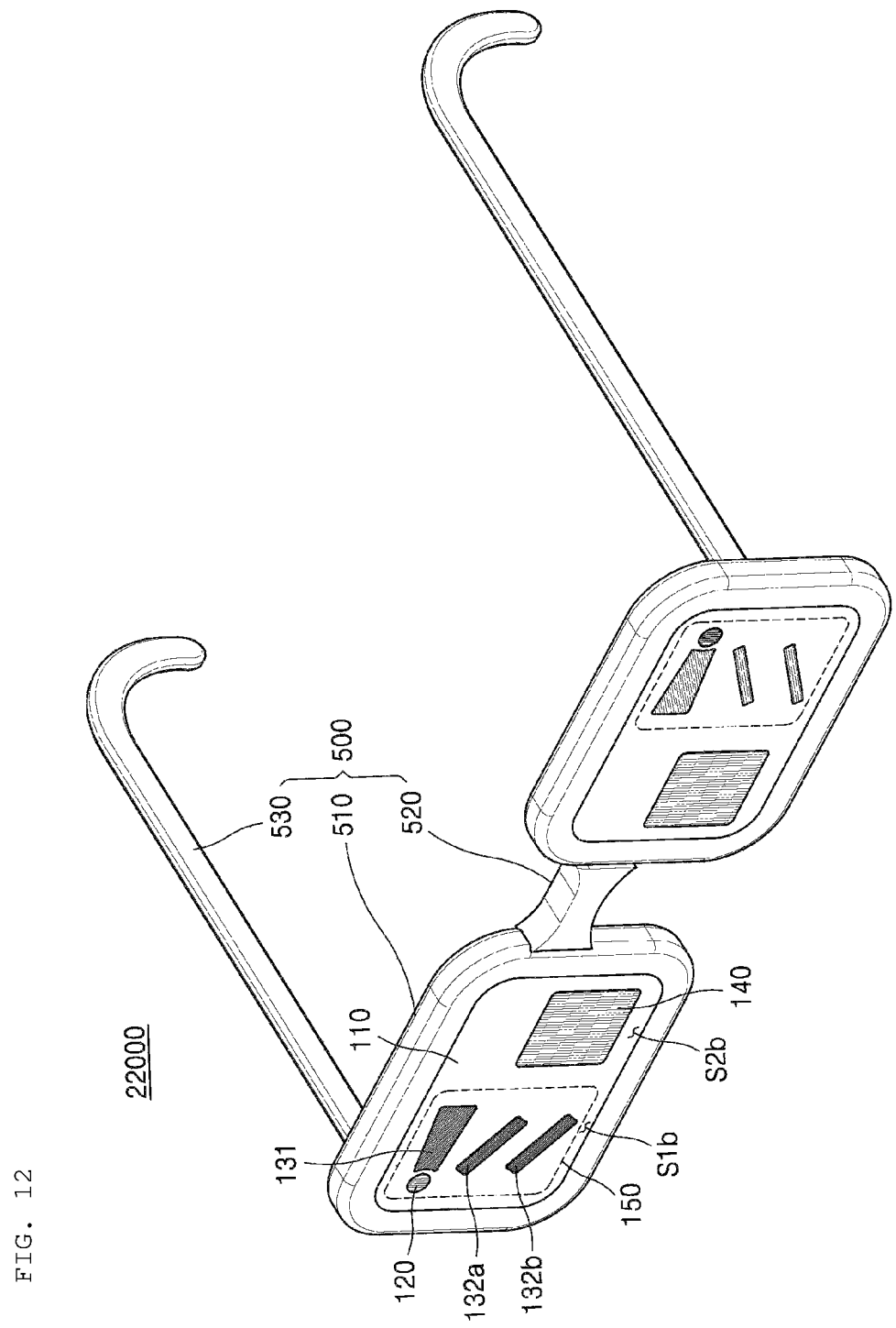

FIG. 12 is a diagram schematically illustrating another form of the second exemplary embodiment of the display device according to another aspect of the present invention.

Figure 13:
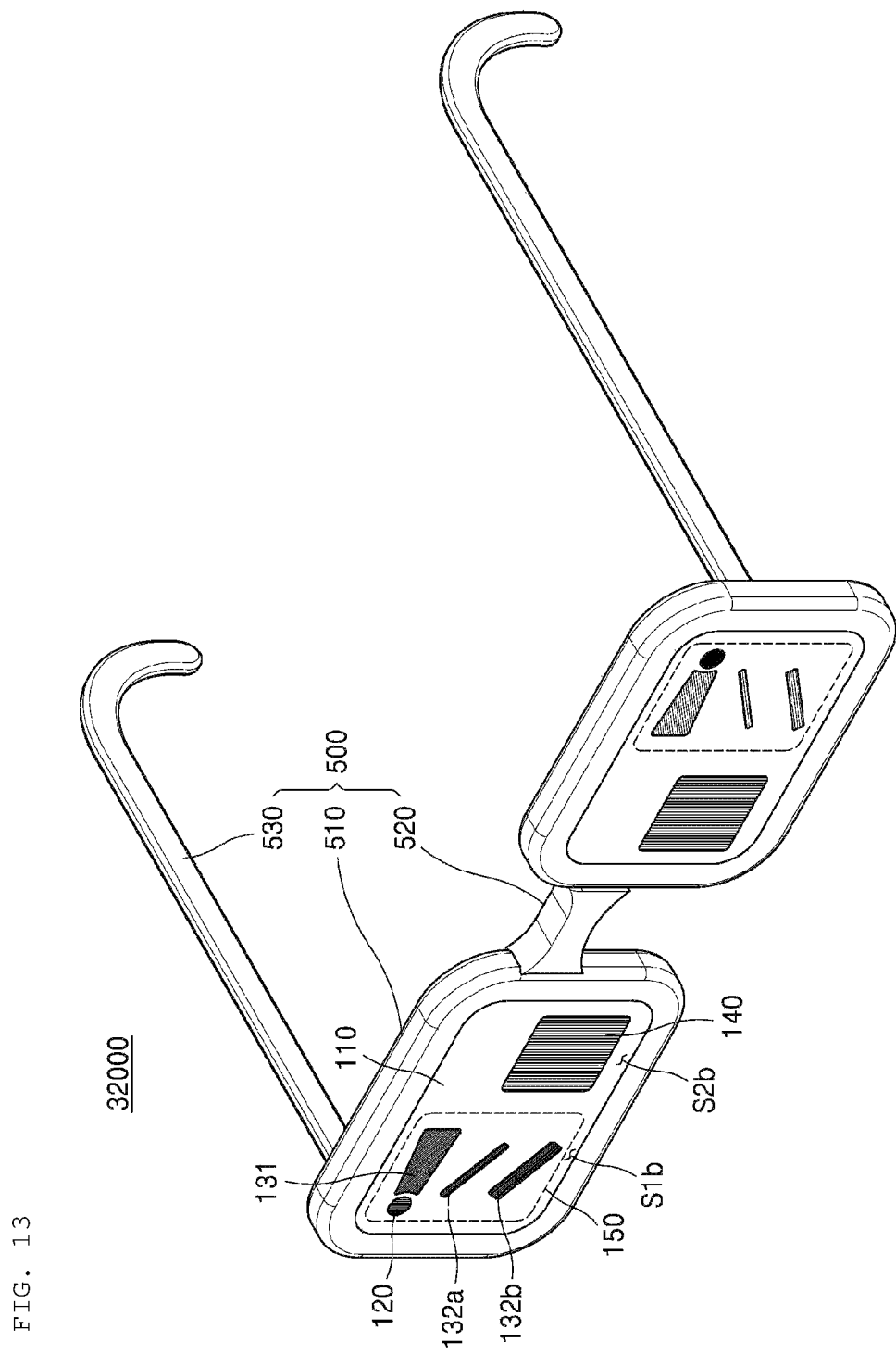

FIG. 13 is a diagram schematically illustrating another form of the third exemplary embodiment of the display device according to another aspect of the present invention.

MODE FOR CARRYING OUT THE INVENTION

The present invention will become clear when referring to the exemplary embodiments described below in detail with reference to the accompanying drawings. However, the present invention is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims. In the meantime, terms used in the present specification are for describing the exemplary embodiments, and do not intend to limit the present invention. In the present specification, a singular form includes plural forms as well, unless otherwise mentioned. A term "comprises" and/or "comprising" does not exclude the existence or an addition of one or more other constituent elements, steps, operations, and/or elements, in addition to the mentioned constituent element, step, operation, and/or element. Terms, such as "a first" and "second" may be used for describing various constituent elements, but the constituent elements shall not be limited by the terms. The terms are used only to discriminate one constituent element from another constituent element.

In the present specification, a term "light guide unit" may be defined as a structure, which guides light at an inner side by using internal total reflection. Under a condition for the internal total reflection, a reflective index of the light guide unit needs to be larger than reflective indexes of a neighboring media adjacent to a surface of the light guide unit. The light guide unit may be formed of a glass and/or plastic material, and may be transparent or semi-transparent. The light guide unit may be formed in various layouts of a plate type. Herein, the term "plate" means a three-dimensional structure having a predetermined thickness between one surface and the other surface that is an opposite side to the one surface, and the one surface and the other surface may also be substantially flat planes, but at least one of the one surface and the other surface may be one-dimensionally or two-dimensionally curved. For example, the light guide unit in the plate type may be one-dimensionally curved, so that one surface and/or the other surface of the light guide unit may have a shape corresponding to a part of a lateral surface of a cylinder. However, the curvature formed by the curve may have a sufficiently large radius of curvature for the easy internal total reflection in order to guide light on the light guide unit.

In the present specification, a term "diffraction optical device" may be defined as a structure for changing a light path by diffracting light on the light guide unit. Herein, the "diffraction optical device" may mean a portion, in which a plurality of grating lines oriented in one direction on the light guide unit is arranged in a predetermined direction and has a pattern to form a predetermined area.

In the present specification, a term "grating line" may mean a protrusion form (that is, an embossed pattern) having a predetermined height on a surface of the light guide unit and/or a recess pattern (that is, an engraved pattern) having a predetermined depth on a surface of the light guide unit. Herein, the orientation direction of the grating line may be freely designed so that a light path may be changed in an intended direction through diffraction by diffraction optical device.

In the present specification, a term "extension direction of the diffraction optical device" may mean a longitudinal direction that is a direction to be calculated to be longer between two directions when it desires to discriminate a length and a width, which may be defined based on two directions appropriately vertically crossing a predetermined region formed by diffraction optical device disposed on the light guide unit.

In the present specification, regarding a term "main direction", when an extended direction and the like of a specific element is desired to be explained and the extended direction is actually parallel to a reference direction or inclined 45° or less (including both a clockwise direction and a counter-clockwise direction) to the reference direction, a phrase like "the specific element is extended in the reference direction as the main direction" may be used.

In the present specification, light internally totally reflected on the light guide unit may be partially diffracted by diffraction optical device and have a changed light path, and the remaining light may be totally reflected along a light path before the diffraction, and the term "diffraction ratio" may mean a value obtained by dividing the amount of light of diffracted light, which is diffracted and has a changed light path, by the amount of light just before the diffraction.

In the present specification, a term "light reception ratio of external light" may mean a ratio of the amount of light of external light, which reaches one surface or the other surface of the light guide unit and is received, to the amount of light of the external light travelling toward the one surface side or the other surface side of the light guide unit.

Figure 1A:
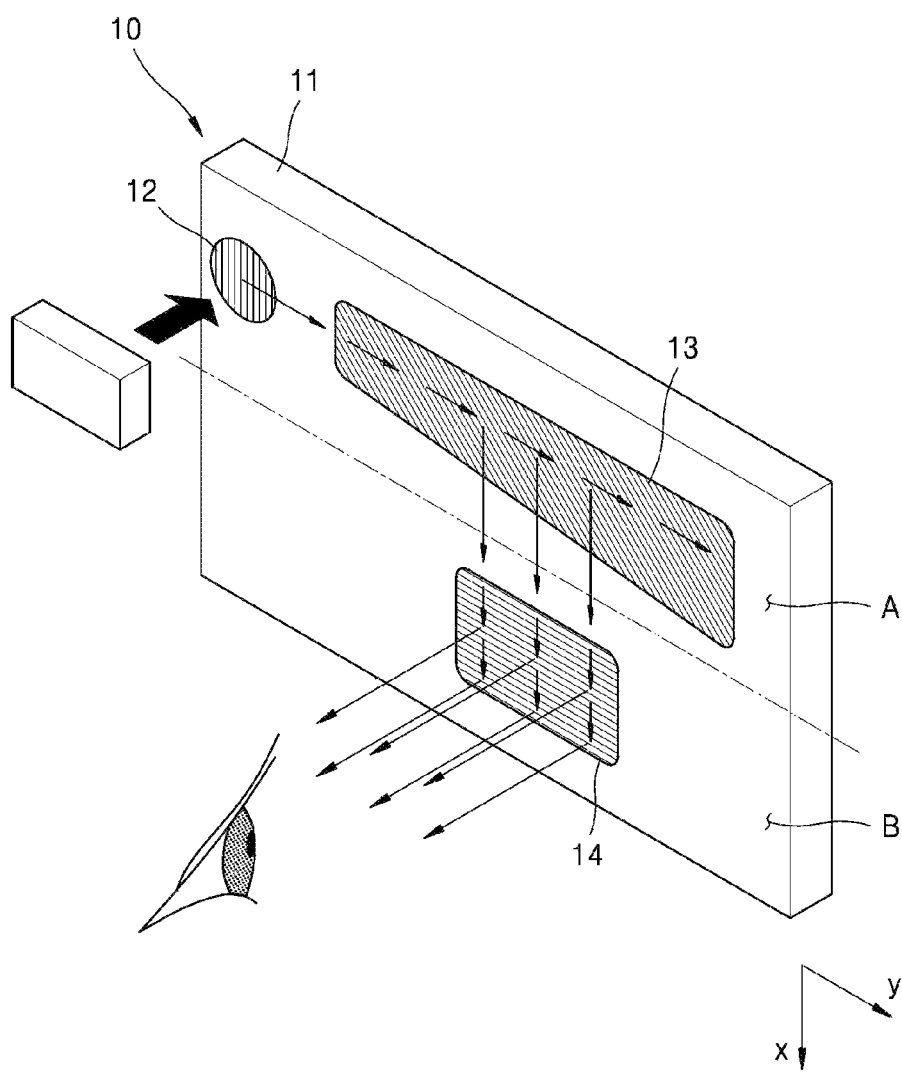
FIG. 1A is a diagram schematically illustrating a diffraction light guide plate according to an exemplary embodiment of the related art.
Figure 1B:
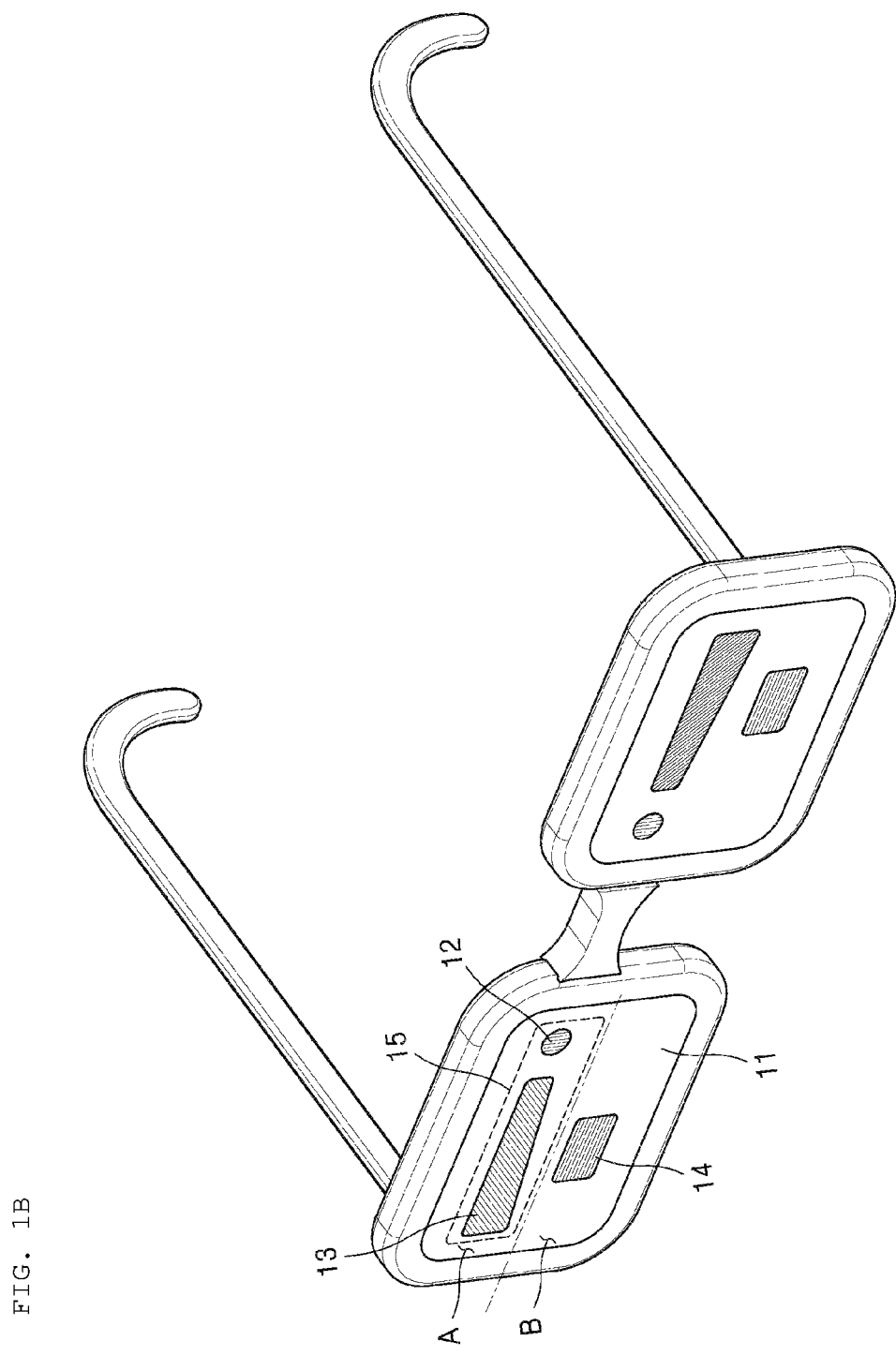
FIG. 1B is a diagram schematically illustrating a display device including the diffraction light guide plate illustrated in FIG. 1A.
Figure 2:
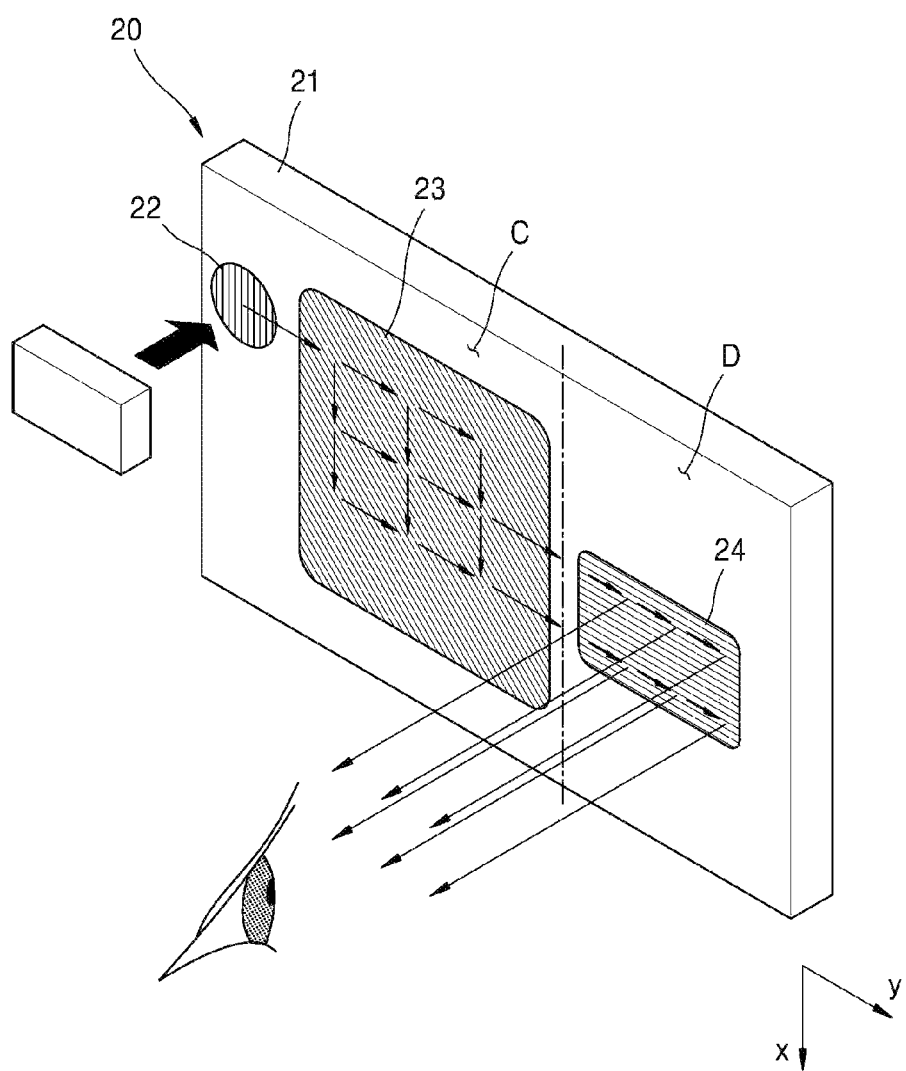
FIG. 2 is a diagram schematically illustrating a diffraction light guide plate according to another example of the related art.
Figure 3:
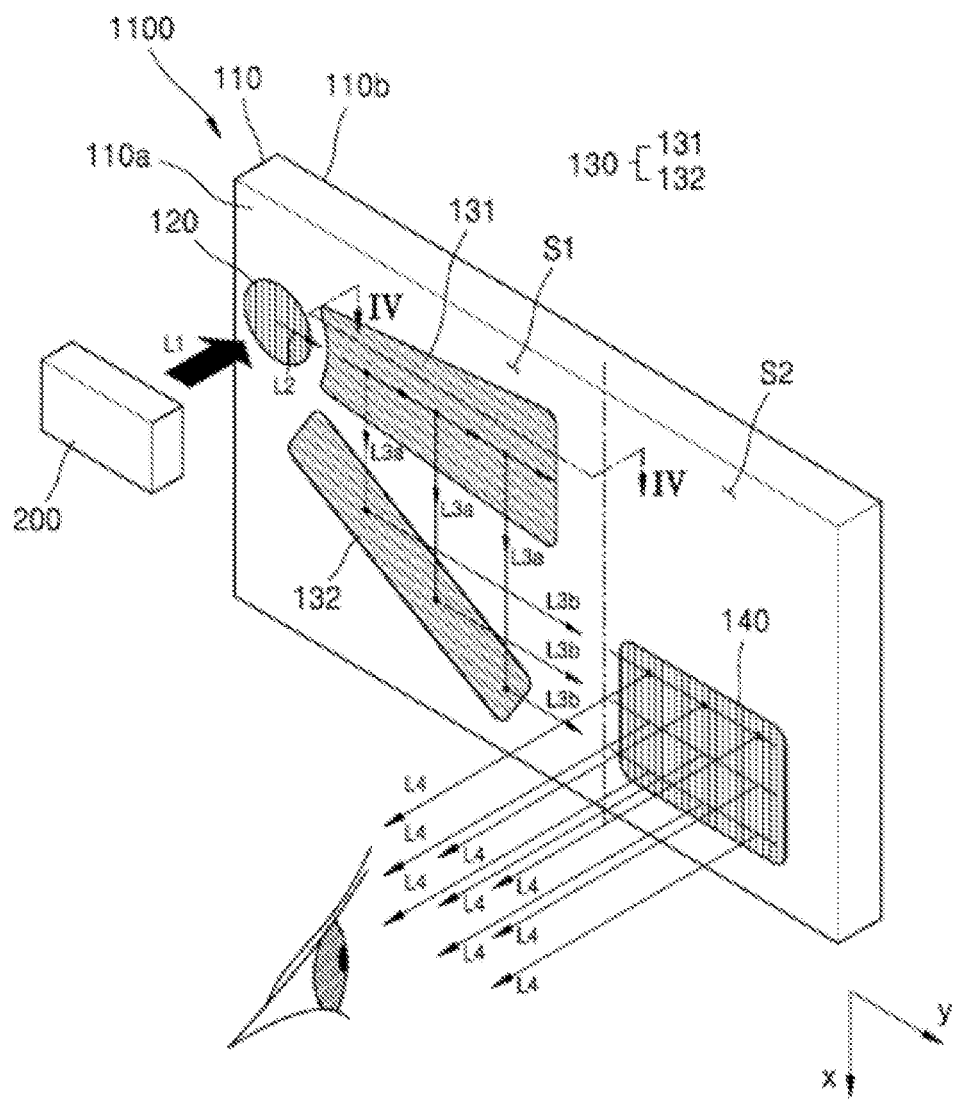
FIG. 3 is a diagram schematically illustrating a first exemplary embodiment of a diffraction light guide plate according to one aspect of the present invention.

FIG. 3 is a diagram schematically illustrating a first exemplary embodiment of a diffraction light guide plate according to one aspect of the present invention.

Referring to FIG. 3, a diffraction light guide plate 1100 may include a light guide unit 110, an input diffraction optical device 120, an intermediate diffraction optical device 130, and an output diffraction optical device 140.

The light guide unit 110 may guide light in an internal side by using internal total reflection.

The input diffraction optical device 120 may receive light L1 from a light source 200 and diffract received light so that the received light is guided on the light guide unit 110. The input diffraction optical device 120 may be disposed on one side (for example, a left side based on FIG. 3) of one surface 110a of the light guide unit 110.

The intermediate diffraction optical device 130 may be configured to receive diffracted light L2 from the input diffraction optical device 120 and allow the received light to be one-dimensionally extended by diffraction. The diffracted light received from the input diffraction optical device 120 is partially diffracted to have a changed light path while passing through the intermediate diffraction optical device 130, and the remaining light may be totally reflected to an existing light path, and light initially received from the input diffraction optical device 120 may be divided into a plurality of beams L3 because the diffraction is performed several times at a point spaced in a specific direction, so that the light may be finally one-dimensionally extended.

The output diffraction optical device 140 may be configured to receive extended light L3b from the intermediate diffraction optical device 130 and allow the received light to be output from the light guide unit 110 by diffraction. In the meantime, the output diffraction optical device 140 may also one-dimensionally extend the light received from the intermediate diffraction optical device 130 by diffraction. In this case, a direction, in which the plurality of beams L3b formed by the light extended by the intermediate diffraction optical device 130 is spaced based on a light receiving side 140a of the output diffraction optical device 140, crosses (for example, be orthogonal to) a direction, in which a plurality of beams L4 extended by the output diffraction optical device 140 is spaced based on the single beam L3b, so that the light is finally two-dimensionally extended based on the light received by the input diffraction optical device 120 from the light source 200.

The intermediate diffraction optical device 130 and the output diffraction optical device 140 may be separately disposed in regions S1 and S2, which are divided horizontally (a y-axis direction based on FIG. 3) on the light guide unit 110, respectively. Particularly, the intermediate diffraction optical device 130 may be disposed in the first region S1 adjacent to the input diffraction optical device 120 between the divided first region S1 and second region S2, and the output diffraction optical device 140 may be disposed in the second region S2 positioned at a right side (based on FIG. 3) of the first region S1.

In the meantime, when external light input other than the light source is incident to the intermediate diffraction optical device 130, interference may be generated in image light, which is output from the light source and is received and diffracted, so that a rainbow pattern may be generated in the region, in which the intermediate diffraction optical device 130 is positioned. Accordingly, it is necessary to provide a reducing unit for reducing a light reception ratio of the external light received in the intermediate diffraction optical device 130.

According to the exemplary embodiment of the present invention, when the intermediate diffraction optical device 130 and the output diffraction optical device 140 are separately disposed in the regions divided horizontally, respectively, the input diffraction optical device 120 and the intermediate diffraction optical device 130 may be closely disposed in a region adjacent to a support part 320 supported by a nose of a wearer or in a region adjacent to a leg part 330 supported by an ear of a wearer when a head mounted display device (see FIG. 8 or 9) in the type of actual glasses is designed. Further, the output diffraction optical device 140 is spaced far apart from the input diffraction optical device 120 and the intermediate diffraction optical device 130, and may be disposed in a region corresponding to a position of a pupil of a wearer. Finally, a reducing unit 150 for reducing a light reception ratio of external light received in the intermediate diffraction optical device 130 may also be disposed in a region corresponding to the intermediate diffraction optical device 130, which is closely disposed in the region adjacent to the support part 320 or the region adjacent to the leg part 330, thereby minimizing interruption by the reducing unit 150 when a wearer sees an external environment.

The intermediate diffraction optical device 130 may include a main intermediate diffraction optical device 131 and an auxiliary intermediate diffraction optical device 132, which are spaced and disposed in a vertical direction (an x-axis direction based on FIG. 3) on the light guide unit 110. Herein, the form, in which the main intermediate diffraction optical device 131 and the auxiliary intermediate diffraction optical device 132 are spaced and disposed in the vertical direction on the light guide unit 110, means the state where the extension directions of the main intermediate diffraction optical device 131 and the auxiliary intermediate diffraction optical device 132 are parallel to each other, and is not limited to the vertically spaced and disposed form, and as long as the main intermediate diffraction optical device 131 and the auxiliary intermediate diffraction optical device 132 are disposed on the light guide unit 110 while having a region, in which a grating line pattern is not formed, therebetween, any spaced and disposed form is available.

The main intermediate diffraction optical device 131 may be optically coupled with the input diffraction optical device 120 through the light guide unit 110 and direct the diffracted light received from the input diffraction optical device 120 to the auxiliary intermediate diffraction optical device 132 by diffraction. In the present exemplary embodiment, the main intermediate diffraction optical device 131 and the auxiliary intermediate diffraction optical device 132 are spaced and disposed in the vertical direction, so that the light diffracted by the main intermediate diffraction optical device 131 may travel through the internal total reflection on the light guide unit 110 in the vertical direction (the x-axis direction based on FIG. 3) as the main direction.

The main intermediate diffraction optical device 131 may be extended in the horizontal direction (the y-axis direction based on FIG. 3) as the main direction.

A diffraction ratio of the main intermediate diffraction optical device 131 may be gradually increased in the extension direction of the main intermediate diffraction optical device 131 from one side (the left side based on FIG. 3) to the other side (the right side based on FIG. 3). The light received by the main intermediate diffraction optical device 131 from the input diffraction optical device 120 is internally totally reflected and moves on the light guide unit 110 in the extension direction of the main intermediate diffraction optical device 131 as the main direction, and the light is partially branched by diffraction on a total reflection path by the grating line pattern, so that the light path heads the auxiliary intermediate diffraction optical device 132. Finally, the amount of light is decreased along the total reflection path which has the extension direction of the main intermediate diffraction optical device 131 as the main direction. That is, the amount of light desired to be diffracted by the grating line pattern is also decreased in the total reflection path, so that the extended light diffracted through the main diffraction optical device 131 and directed to the auxiliary intermediate diffraction optical device 132, that is, the plurality of first beams L3a, may have the similar amount of light by increasing a diffraction ratio in the extension direction of the main intermediate diffraction optical device 131.

Figure 4A:
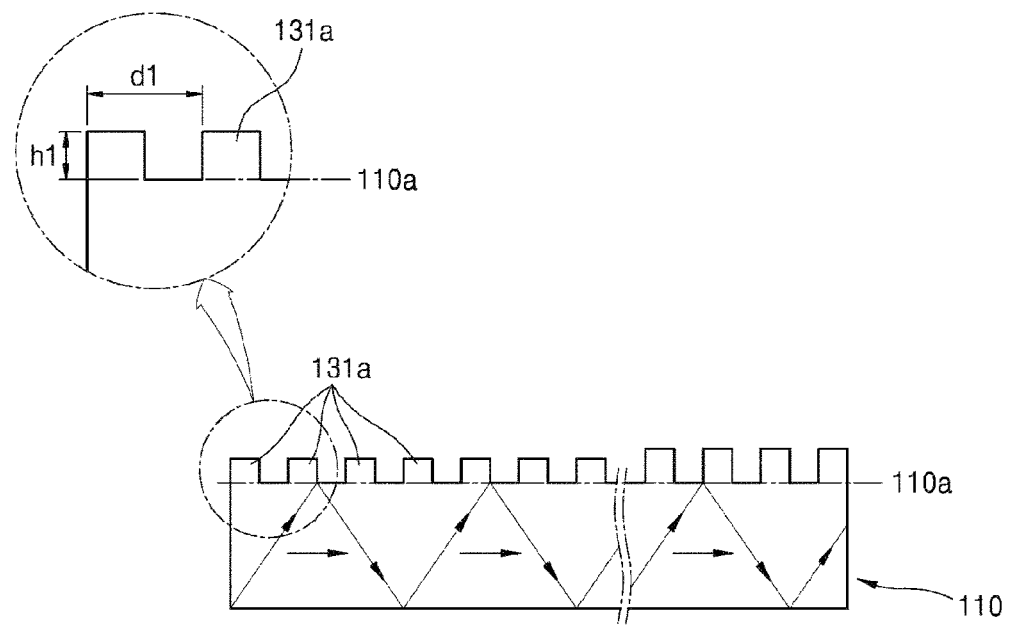
FIGS. 4A to 4C are cross-sectional diagrams taken along line IV-IV of FIG. 3 and are diagrams illustrating various exemplary embodiments for adjusting a diffraction ratio in a main intermediate diffraction optical device.
Figure 4B:
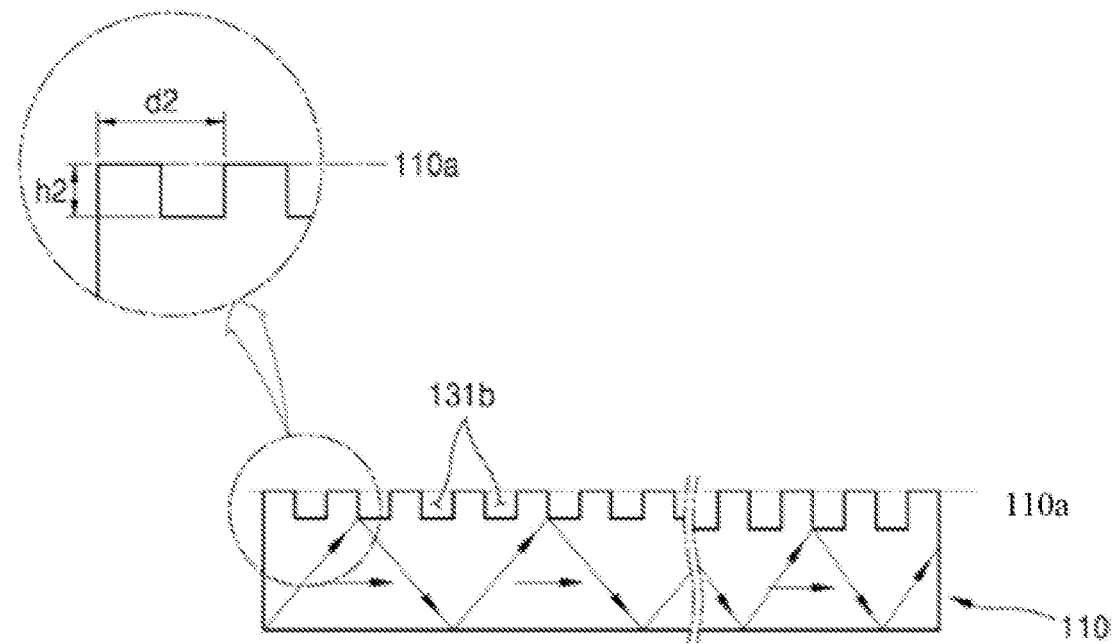
Figure 4C:
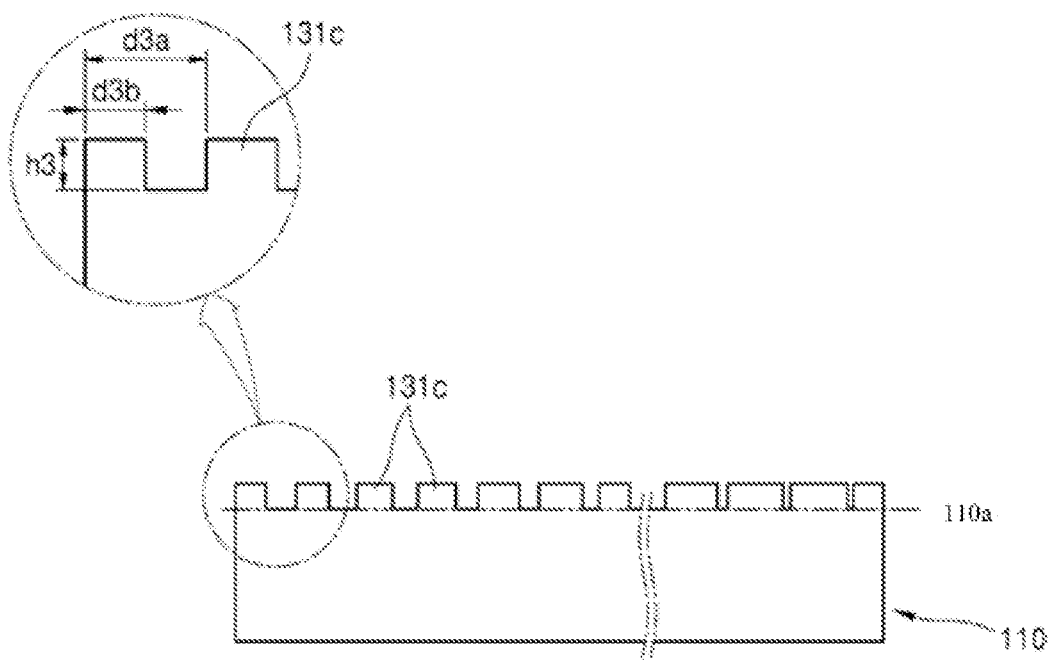

FIGS. 4A to 4C are cross-sectional diagrams taken along line IV-IV of FIG. 3 and are diagrams illustrating various exemplary embodiments for adjusting a diffraction ratio in the main intermediate diffraction optical device.

Referring to FIG. 4A, the plurality of grating lines included by the main intermediate diffraction optical device 131 may be provided in a protrusion form 131a having a predetermined height h1 on one surface 110a of the light guide unit 110. The grating lines in the protrusion forms 131a may be disposed while having a predetermined period d1 in the extension direction of the main intermediate diffraction optical device 131. Further, the grating line in the protrusion form 131a may have a gradually increasing height h1 from one side to the other side in the extension direction of the main intermediate diffraction optical device 131. Herein, the degree of the increase in the height h1 of the grating line of the protrusion form 131a may have a form continuously increasing with a predetermined ratio in the extension direction, but may also have a step function form, in which the degree is uniform within a predetermined section and then is further increased in another section.

Referring to FIG. 4B, the plurality of grating lines included by the main intermediate diffraction optical device 131 may be provided in a recess form 131b having a predetermined depth h2 on one surface 110a of the light guide unit 110. The grating lines in the recess form 131b may be disposed while having a predetermined period d2 in the extension direction of the main intermediate diffraction optical device 131. Further, the grating line in the recess form 131b may have a gradually increasing depth h2 from one side to the other side in the extension direction of the main intermediate diffraction optical device 131. Herein, the degree of the increase in the depth h2 of the grating line of the recess form 131b may have a form continuously increasing with a predetermined ratio in the extension direction, but may also have a step function form, in which the degree is uniform within a predetermined section and then is further increased in another section in the extension direction.

Referring to FIG. 4C, the plurality of grating lines included by the main intermediate diffraction optical device 131 may be provided in a protrusion form 131c having a predetermined height h3 on one surface 110a of the light guide unit 110. The grating lines in the protrusion forms 131c may be disposed while having a predetermined period d3a in the extension direction of the main intermediate diffraction optical device 131. In the meantime, the grating line of the protrusion form 131a may have a predetermined width d3b within the period d3a, and a value (d3b/d3a) obtained by dividing the width d3b of the grating line by the period d3a of the grating line is defined as "duty". Herein, the duty of the grating line may be increased from one side to the other side in the extension direction of the main intermediate diffraction optical device 131. Herein, the degree of increase in the duty of the grating line may have a form continuously increasing with a predetermined ratio in the extension direction, but may also have a step function form, in which the degree is uniform within a predetermined section and then is further increased in another section.

The auxiliary intermediate diffraction optical device 132 may be optically coupled with the main intermediate diffraction optical device 131 through the light guide unit 110 and direct the diffracted light received from the main intermediate diffraction optical device 131 to the output diffraction optical device 140 by diffraction. In the present exemplary embodiment, the intermediate diffraction optical device 130 and the output diffraction optical device 140 are disposed in the horizontally divided regions, respectively, and the light diffracted by the auxiliary intermediate diffraction optical device 132 may travel through the internal total reflection on the light guide unit 110 in the horizontal direction (the y-axis direction based on FIG. 3) as the main direction.

The extension direction of the auxiliary intermediate diffraction optical device 132 may be inclined toward a lower side (based on FIG. 3) of the light guide unit 110 with respect to the extension direction of the main intermediate diffraction optical device 131. In the meantime, the light diffracted by the auxiliary intermediate diffraction optical device 132 travels toward the output diffraction optical device 140 side while being internally totally reflected toward a right side (based on FIG. 3) of the light guide unit 110, and may approximately form a light path in the extension direction of the main intermediate diffraction optical device 131 as the main direction. Unlike the present exemplary embodiment, when the extension direction of the auxiliary intermediate diffraction optical device is approximately parallel to the extension direction of the main intermediate diffraction optical device, the light travelling to the output diffraction optical device repeatedly meets the grating lines occupied in the extension direction of the auxiliary intermediate diffraction optical device, and the light path may be deviated little by little each time. In this case, it is difficult to form an intended light path, and finally, a quality of an image formed by the light is degraded. In the meantime, like the present exemplary embodiment, when the extension direction of the auxiliary intermediate diffraction optical device 132 is inclined toward the lower side (based on FIG. 3) of the light guide unit 110 with respect to the extension direction of the main intermediate diffraction optical device 131, the light travelling to the output diffraction optical device 140 side travels in an inclined direction with respect to the extension direction of the auxiliary intermediate diffraction optical device 132 toward an upper side (based on FIG. 3) of the light guide unit 110, so that the number of times that the travelling light meets the grating lines occupied in the extension direction of the auxiliary intermediate diffraction optical device 132 may be definitely decreased compared to that of the foregoing case, and it is possible to prevent the light path from being deviated to a non-intended path. Finally, there is an advantage in that a quality of an image formed by the light may be maintained in a high level.

The auxiliary intermediate diffraction optical device 132 may have substantially the same diffraction ratio from one side (the left side based on FIG. 3) to the other side (the right side based on FIG. 3) in the extension direction thereof. The auxiliary intermediate diffraction optical device 132 may receive the plurality of first beams L3a and allow the received first beams L3a to be directed to the output diffraction optical device 140 by diffraction, and to be internally totally reflected through the light guide unit 110 in the form of a plurality of second beams L3b, of which a light path is changed. In this case, in the present exemplary embodiment, the plurality of first beams L3a has the similar amount of light, so that the plurality of second beams L3b, of which the light path is changed, may also have the similar amount of light only when the diffraction ratio at each point, at which the first beam L3a is diffracted by the auxiliary intermediate diffraction optical device 132 is substantially the same. Herein, the diffraction ratio of the auxiliary intermediate diffraction optical device 132 may be larger than a maximum diffraction ratio of the main intermediate diffraction optical device 131, and particularly, may be close to 100%. The auxiliary intermediate diffraction optical device 132 changes the light path of the received first beam L3a to the form of the second beam L3b so that the light paths of most of the received first beams L3a are changed by diffraction, and this is for the purpose of minimizing the sharp decrease in the amount of light of the second beam L3b compared to the first beam L3a.

The intermediate diffraction optical device 130 may be disposed at one surface 110a side of the light guide unit 110. The reducing unit 150 for reducing a reception ratio of external light other than the light L output from the light source 200 may be disposed in a region corresponding to the region, in which the intermediate diffraction optical device 130 is positioned, at one surface 110a side or the other surface 110b side of the light guide unit. Herein, the reducing unit 150 may be a film layer, which is capable of covering the region corresponding to the region, in which the intermediate diffraction optical device 130 is positioned, at one surface 110a side or the other surface 110b side of the light guide unit, and may include an opaque material, for example, a black material. The reducing unit 150 may include, for example, black ink. Another aspect of the reducing unit 150 may be a plastic or glass structure, which is disposed while being spaced apart from a region corresponding to the region, in which the intermediate diffraction optical device 130 is positioned, at one surface 110a side or the other surface 110b side of the light guide unit, at a predetermined distance in a direction spacing from the light guide unit 110. The plastic or glass structure may also include an opaque material, for example, a black material, and more particularly, black ink.

FIG. 5 is a diagram schematically illustrating a second exemplary embodiment of a diffraction light guide plate according to one aspect of the present invention. Most of the configurations of a diffraction light guide plate 2100 of the second exemplary embodiment are the same as those of the diffraction light guide plate 1100 of the first exemplary embodiment, so that a description thereof will be omitted and only the differences therebetween will be described.

In the diffraction light guide plate 2100 of the second exemplary embodiment, an intermediate diffraction optical device 130 includes a main intermediate diffraction optical device 131 and an auxiliary intermediate diffraction optical device 132, which are disposed while being spaced apart from each other on the light guide unit 110 in a vertical direction (an x-axis direction based on FIG. 5), similar to the diffraction light guide plate 1100 of the first exemplary embodiment.

In the meantime, it is illustrated and described that in the diffraction light guide plate 1100 of the first exemplary embodiment, the single auxiliary intermediate diffraction optical device 132 is provided, but in the diffraction light guide plate 2100 of the second exemplary embodiment, the plurality of auxiliary intermediate diffraction optical devices 132 may be provided so as to be spaced from each other on the light guide unit 110 in the vertical direction (the x-axis direction based on FIG. 5). In each of the auxiliary intermediate diffraction optical devices 132a and 132b, a main light path may be configured to receive light heading from an upper side to a lower side of the light guide unit 110 (based on FIG. 5) and allow the light to be directed to an output diffraction optical device 140 side by diffraction. In the second exemplary embodiment, the intermediate diffraction optical device 130 and the output diffraction optical device 140 are disposed in regions divided horizontally, respectively, so that light diffracted by the auxiliary intermediate diffraction optical devices 132a and 132b may travel through the internal total reflection on the light guide unit 110 in a horizontal direction (a y-axis direction based on FIG. 5) as a main direction.

In the meantime, as the number of auxiliary intermediate diffraction optical devices 132, which are spaced apart from each other in the vertical direction, is large, light L3a diffracted by the main intermediate diffraction optical device 131 may be re-branched into a plurality of beams L3b and L3b' in the vertical direction, in which the auxiliary intermediate diffraction optical devices 132 are spaced apart from each other, and be extended. Accordingly, it is possible to achieve the one-dimensional extension of the light as much as the target amount by increasing the number of auxiliary intermediate diffraction optical devices 132, rather than increasing extension lengths of the main intermediate diffraction optical device 131 and the auxiliary intermediate diffraction optical device 132. However, when the number of auxiliary intermediate diffraction optical devices 132 is increased, the number of times that the travelling light meets the grating lines will also increase, and there is a high possibility in that the actual light path is deviated by the meet compared to the intended target light path. Accordingly, it is preferable to minimize the number of auxiliary intermediate diffraction optical devices 132. For example, like the exemplary embodiment of the present invention, the auxiliary intermediate diffraction optical device 132 may include two auxiliary intermediate diffraction optical devices including the first auxiliary intermediate diffraction optical device 132a and the second auxiliary intermediate diffraction optical device 132b.

The first auxiliary intermediate diffraction optical device 132a, which is adjacently disposed to the main intermediate diffraction optical device 131 between the plurality of auxiliary intermediate diffraction optical devices 132a and 132b, is optically coupled to the main intermediate diffraction optical device 131 through the light guide unit 110, and direct the diffracted light L3a received from the main intermediate diffraction optical device 131 to the output diffraction optical device 140 in the form of diffracted light L3b by diffraction.

The second auxiliary intermediate diffraction optical device 132b, which is adjacently disposed to the first auxiliary intermediate diffraction optical device 132a between the plurality of auxiliary intermediate diffraction optical devices 132a and 132b, may be optically coupled to the first auxiliary intermediate diffraction optical device 132a through the light guide unit 110, and receive the light L3a', which is not diffracted to the output diffraction optical device 140 by the first auxiliary intermediate diffraction optical device 132a, and direct the received light L3a' to the output diffraction optical device 140 in the form of diffracted light L3b' by diffraction.

The extension direction of the first auxiliary intermediate diffraction optical device 132a and the second auxiliary intermediate diffraction optical device 132b may be parallel to each other. This is for the purpose of forming a spaced distance in the vertical direction of the light guide unit 110 between the plurality of beams L3b, of which the light path is changed by the first auxiliary intermediate diffraction optical device 132a, and a spaced distance in the vertical direction of the light guide unit 110 between the plurality of beams L3b', of which the light path is changed by the second auxiliary intermediate diffraction optical device 132b, to be similar by forming a spaced distance in the vertical direction of the light guide unit 110 between the points, at which the plurality of beams L3a meets in the extension direction of the first auxiliary intermediate diffraction optical device 132a, and a spaced distance in the vertical direction of the light guide unit 110 between the points, at which the plurality of beams L3a' meets in the extension direction of the second auxiliary intermediate diffraction optical device 132b, to be similar. Accordingly, a ratio of light amount decreased according to the extension of the light may be similarly maintained over the region, in which the light is extended.

The auxiliary intermediate diffraction optical devices 132a and 132b may substantially have the same diffraction ratio from one side (the left side based on FIG. 5) to the other side (the right side based on FIG. 5) in the extension directions thereof. The auxiliary intermediate diffraction optical device 132 may receive the plurality of first beams L3a and L3a' and allow the received first beams L3a and L3a' to be directed to the output diffraction optical device 140 by diffraction, and to be internally totally reflected through the light guide unit 110 in the form of a plurality of second beams L3b and L3b', of which a light path is changed. In this case, in the present exemplary embodiment, the plurality of first beams L3a or L3a' have the similar amount of light, so that when the diffraction ratio at each point, at which the first beam L3a or L3a' is diffracted by the auxiliary intermediate diffraction optical devices 132a and 132b, is substantially the same, the amount of light of the plurality of second beams L3b or L3b', of which the light path is changed, may also become similar.

Herein, the diffraction ratio of the second auxiliary intermediate diffraction optical device 132b may be larger than the diffraction ratio of the first auxiliary intermediate diffraction optical device 132a. For example, the diffraction ratio of the first auxiliary intermediate diffraction optical device 132a may be close to about 50%, and the diffraction ratio of the second auxiliary intermediate diffraction optical device 132b may be close to about 100%. Accordingly, the first auxiliary intermediate diffraction optical device 132a may diffract the light L3a received from the main intermediate diffraction optical device 131 by about 50% (accordingly, the amount of light L3b is about 50% of the amount of light L3a), make the remaining 50% travel to the second auxiliary intermediate diffraction optical device 132b side (accordingly, the amount of light L3a' is about 50% of the amount of light L3a), and the second auxiliary intermediate diffraction optical device 132b may diffract the light L3a' received from the first auxiliary intermediate diffraction optical device 132a close to 100% (accordingly, the amount of light L3b' is about 50% of the amount of light L3a). Finally, the amount of light L3b, which is diffracted by the first auxiliary intermediate diffraction optical device 132a and has the changed light path, and the amount of light L3b', which is diffracted by the second auxiliary intermediate diffraction optical device 132b and has the changed light path, may be similar to each other in the level of 50% of the amount of light L3a, which is diffracted by the main intermediate diffraction optical device 131 and has the changed light path.

(a) of FIG. 6 is a cross-sectional diagram taken along line VI-VI of FIG. 5 and (b) of FIG. 6 is a cross-sectional diagram taken along line VI'-VI' of FIG. 5, and (a) of FIG. 6 and (b) of FIG. 6 are diagrams illustrating an exemplary embodiment, in which diffraction ratios of the first auxiliary intermediate diffraction optical device and the second auxiliary intermediate diffraction optical device are different.

(a) and (b) of FIG. 6 illustrate the cases where all of the grating lines of the first auxiliary intermediate diffraction optical device 132a and the second auxiliary intermediate diffraction optical device 132b are provided in the forms of protrusions 1321a and 1321b having predetermined heights ha and hb on one surface 110a of the light guide unit 110. However, the plurality of grating lines may also be provided in the form of a recess having a predetermined depth on one surface 110a of the light guide unit 110, in addition to the form of protrusion. Hereinafter, for convenience of the description, the present invention will be described based on the case where the plurality of grating lines is provided in the forms of protrusions 1321a and 1321b. The grating lines in the forms of protrusions 1321a and 1321b may be disposed while having a predetermined period d5. In the meantime, the heights ha and hb of the grating lines in the form of the protrusions 1321a and 1321b may be the same in the extension direction within the first auxiliary intermediate diffraction optical device 132a and the second auxiliary intermediate diffraction optical device 132b. This is for the purpose of forming the diffraction ratio of the first auxiliary intermediate diffraction optical device 132a or the second auxiliary intermediate diffraction optical device 132b to be the same in the extension direction of the first auxiliary intermediate diffraction optical device 132a or the second auxiliary intermediate diffraction optical device 132b. However, the height hb of the grating line in the form of the protrusion 1321b of the second auxiliary intermediate diffraction optical device 132b may be larger than the height ha of the grating line in the form of the protrusion 1321a of the first auxiliary intermediate diffraction optical device 132a. This is for the purpose of forming the diffraction ratio of the second auxiliary intermediate diffraction optical device 132b to be larger than the diffraction ratio of the first auxiliary intermediate diffraction optical device 132a. In the meantime, when the grating lines are formed in the forms of recesses in the first and second auxiliary intermediate diffraction optical devices 132a and 132b, the recess of the second auxiliary intermediate diffraction optical device 132a may be deeper than the recess of the first auxiliary intermediate diffraction optical device 131b.

FIG. 7 is a diagram schematically illustrating a third exemplary embodiment of the diffraction light guide plate according to one aspect of the present invention. Most of the configurations of a diffraction light guide plate 3100 of the third exemplary embodiment are the same as those of the diffraction light guide plate 1100 of the first exemplary embodiment, so that only a description thereof will be omitted and only the differences therebetween will be described.

In the diffraction light guide plate 3100 of the third exemplary embodiment, an intermediate diffraction optical device 130 includes a main intermediate diffraction optical device 131 and an auxiliary intermediate diffraction optical device 132, which are disposed while being spaced apart from each other in a vertical direction (an x-axis direction based on FIG. 7) on the light guide unit 110, similar to the diffraction light guide plate 1100 of the first exemplary embodiment.

In the meantime, it is illustrated and described that in the diffraction light guide plate 1100 of the first exemplary embodiment, the single auxiliary intermediate diffraction optical device 132 is provided, but in the diffraction light guide plate 3100 of the third exemplary embodiment, the plurality of auxiliary intermediate diffraction optical devices 132 may be provided so as to be spaced from each other on the light guide unit 110 in the vertical direction (the x-axis direction based on FIG. 7). In each of the auxiliary intermediate diffraction optical devices 132a and 132b, a main light path may be configured to receive light heading from an upper side to a lower side of the light guide unit 110 (based on FIG. 7) and allow the light to be directed to an output diffraction optical device 140 side by diffraction. In the present exemplary embodiment, the intermediate diffraction optical device 130 and the output diffraction optical device 140 are disposed in the horizontally divided regions, respectively, and the light diffracted by the auxiliary intermediate diffraction optical device 132 may travel through the internal total reflection on the light guide unit 110 in the horizontal direction (the y-axis direction based on FIG. 3) as the main direction.

In the meantime, as the number of auxiliary intermediate diffraction optical devices 132, which are spaced apart from each other in the vertical direction, is large, light L3a diffracted by the main intermediate diffraction optical device 131 may be re-branched into a plurality of beams L3b and L3b' in the vertical direction, in which the auxiliary intermediate diffraction optical devices 132 are spaced apart from each other, and be extended. Accordingly, it is possible to achieve the one-dimensional extension of the light as much as the target amount by increasing the number of auxiliary intermediate diffraction optical devices 132, rather than increasing extension lengths of the main intermediate diffraction optical device 131 and the auxiliary intermediate diffraction optical device 132. However, when the number of auxiliary intermediate diffraction optical devices 132 is increased, the number of times that the travelling light meets the grating lines will also increase, and the actual light path is highly possible to be deviated compared to the intended target light path by the meet. Accordingly, it is preferable to minimize the number of auxiliary intermediate diffraction optical devices 132. For example, like the exemplary embodiment of the present invention, the auxiliary intermediate diffraction optical device 132 may include two auxiliary intermediate diffraction optical devices including the first auxiliary intermediate diffraction optical device 132a and the second auxiliary intermediate diffraction optical device 132b.

The first auxiliary intermediate diffraction optical device 132a, which is adjacently disposed to the main intermediate diffraction optical device 131 between the plurality of auxiliary intermediate diffraction optical devices 132a and 132b, is optically coupled to the main intermediate diffraction optical device 131 through the light guide unit 110, and receives a part of the diffracted light L3a from the main intermediate diffraction optical device 131 and direct the received part of the light L3a to the output diffraction optical device 140 side in the form of light L3b by diffraction.

The second auxiliary intermediate diffraction optical device 132b, which is adjacently disposed to the first auxiliary intermediate diffraction optical device 132a between the plurality of auxiliary intermediate diffraction optical devices 132a and 132b, may be optically coupled to the main intermediate diffraction optical device 131 through the light guide unit 110, and receive at least a part L3a' of the diffracted light L3a, which is not received by the first auxiliary intermediate diffraction optical device 132a, from the main intermediate diffraction optical device 131, and direct the received light L3a' to the output diffraction optical device 140 side in the form of light L3b' by diffraction.

The extension direction of the first auxiliary intermediate diffraction optical device 132a and the second auxiliary intermediate diffraction optical device 132b may be parallel to each other. This is for the purpose of forming a spaced distance in the vertical direction of the light guide unit 110 between the plurality of beams L3b, of which the light path is changed by the first auxiliary intermediate diffraction optical device 132a, and a spaced distance in the vertical direction of the light guide unit 110 between the plurality of beams L3b', of which the light path is changed by the second auxiliary intermediate diffraction optical device 132b, to be similar by forming a spaced distance in the vertical direction of the light guide unit 110 between the points, at which the plurality of beams L3a meets in the extension direction of the first auxiliary intermediate diffraction optical device 132a, and a spaced distance in the vertical direction of the light guide unit 110 between the points, at which the plurality of beams L3a' meets in the extension direction of the second auxiliary intermediate diffraction optical device 132b, to be similar. Accordingly, a ratio of light amount decreased according to the extension of the light may be similarly maintained over the region, in which the light is extended.

The auxiliary intermediate diffraction optical devices 132a and 132b may substantially have the same diffraction ratio from one side (the left side based on FIG. 7) to the other side (the right side based on FIG. 7) in the extension directions thereof. The auxiliary intermediate diffraction optical device 132 may receive at least a part of the first beams L3a and L3a' and allow the received part of the first beams L3a and L3a' to be directed to the output diffraction optical device 140 side by diffraction, and to be internally totally reflected through the light guide unit 110 in the form of the plurality of second beams L3b and L3b', of which a light path is changed. In this case, in the present exemplary embodiment, the plurality of first beams L3a or L3a' have similar amount of light, so that when the diffraction ratio at each point, at which at least a part of the first beam L3a or L3a' is diffracted by the auxiliary intermediate diffraction optical devices 132a and 132b, is substantially the same, the amount of light of the plurality of second beams L3b or L3b', of which the light path is changed, may also become similar.

Herein, a width w_b of the second auxiliary intermediate diffraction optical device 132b in a direction crossing the extension direction of the second auxiliary intermediate diffraction optical device 132b may be larger than a width w_a of the first auxiliary intermediate diffraction optical device 132a. First, the present invention will be described on an assumption that the beam L3a diffracted by the main intermediate diffraction optical device 131 is a circular beam having a predetermined diameter. As one exemplary embodiment, the width w_a of the first auxiliary intermediate diffraction optical device 132a may be formed to be about 50% of a diameter of the beam L3a branched and diffracted by the main intermediate diffraction optical device 131, and the width w_b of the second auxiliary intermediate diffraction optical device 132b may be formed to be 100% or more of the diameter of the beam L3a branched and diffracted by the main intermediate diffraction optical device. Further, both the diffraction ratios of the first auxiliary intermediate diffraction optical device 132a and the second auxiliary intermediate diffraction optical device 132b may be formed to be close to 100%. Accordingly, the first auxiliary intermediate diffraction optical device 132a may receive and diffract a region about 50% of the beam L3a branched and diffracted by the main intermediate diffraction optical device 131 (accordingly, the amount of light L3b is about 50% of the amount of light L3a), the beam L3a', which is not received by the first auxiliary intermediate diffraction optical device 132a, may travel to the second auxiliary intermediate diffraction optical device 132b (accordingly, the amount of light L3a' is about 50% of the amount of light L3a), and the second auxiliary intermediate diffraction optical device 132b may receive and diffract the entire region of the beam L3a', which is not received by the first auxiliary intermediate diffraction optical device 132a (accordingly, the amount of light L3b' is similar to the amount of light L3a' and is about 50% of the amount of light L3a). Finally, the amount of light L3b, which is diffracted by the first auxiliary intermediate diffraction optical device 132a and has the changed light path, and the amount of light L3b', which is diffracted by the second auxiliary intermediate diffraction optical device 132b and has the changed light path, may be similar to each other in the level of 50% of the amount of light L3a, which is diffracted by the main intermediate diffraction optical device 131 and has the changed light path.

FIG. 8 is a diagram schematically illustrating one form of a first exemplary embodiment of a display device according to another aspect of the present invention, FIG. 9 is a diagram schematically illustrating one form of a second exemplary embodiment of a display device according to another aspect of the present invention, and FIG. 10 is a diagram schematically illustrating one form of a third exemplary embodiment of a display device according to another aspect of the present invention.

The display devices 11000, 21000, and 31000 may include light sources (not illustrated), which output image light forming images, and the diffraction light guide plates 1100, 2100, and 3100 according to the aspects of the present invention, respectively. Herein, the display devices 11000, 21000, and 31000 may have head mounted type display devices having the structures, in which the diffraction light guide plates 1100, 2100, and 3100 are coupled to main bodies 300 shaped like eyeglass frames, respectively. Herein, the main body 300 may include a pair of border parts 310, to which each of the diffraction light guide plates 1100, 2100, and 3100 is coupled, a support part 320, which connects one side of the pair of border part 310 and is supported by a nose (not illustrated) of a wearer, and a leg part 330, which is connected to the other side of the border part 310 and is supported by an ear (not illustrated) of the wearer.

In the diffraction light guide plates 1100, 2100, and 3100 and/or the display devices 11000, 21000, and 31000 according to the exemplary embodiments of the present invention, the intermediate diffraction optical device 130 and the output diffraction optical device 140 are separately disposed in the regions divided horizontally (the y-axis directions based on FIGS. 8 to 10) of the light guide unit 110, so that more particularly, the intermediate diffraction optical device 130 may be closely disposed to a region Sla adjacent to the support part 320 supported by the nose (not illustrated) of the wearer and the output diffraction optical device 140 may be disposed in a region S2a adjacent to the leg part 330 supported by the ear of the wearer. Accordingly, even though the reducing unit 150 is disposed in a region on the other surface 110b of the light guide unit 110 corresponding to the region, in which the intermediate diffraction optical device 130 is positioned, it is possible to minimize blurring of the wearer's view due to the reducing unit 150.

FIG. 11 is a diagram schematically illustrating another form of the first exemplary embodiment of the display device according to another aspect of the present invention, FIG. 12 is a diagram schematically illustrating another form of the second exemplary embodiment of the display device according to another aspect of the present invention, and FIG. 13 is a diagram schematically illustrating another form of the third exemplary embodiment of the display device according to another aspect of the present invention.

The display devices 12000, 22000, and 32000 may include light sources (not illustrated), which output image light forming images, and the diffraction light guide plates 1100, 2100, and 3100 according to the aspects of the present invention. Herein, the display devices 12000, 22000, and 32000 may have head mounted type display devices having the structures, in which the diffraction light guide plates 1100, 2100, and 3100 are coupled to main bodies 500 shaped like eyeglass frames, respectively. Herein, the main body 500 may include a pair of border parts 510, to which each of the diffraction light guide plates 1100, 2100, and 3100 is coupled, a support part 520, which connects one side of the pair of border part 510 and is supported by a nose (not illustrated) of a wearer, and a leg part 530, which is connected to the other side of the border part 510 and is supported by an ear (not illustrated) of the wearer.

In the diffraction light guide plates 1100, 2100, and 3100 and/or the display devices 12000, 22000, and 32000 according to the exemplary embodiments of the present invention, the intermediate diffraction optical device 130 and the output diffraction optical device 140 are separately disposed in the regions divided horizontally (the y-axis directions based on FIGS. 11 to 13) of the light guide unit 110, so that more particularly, the intermediate diffraction optical device 130 may be closely disposed to a region Sib adjacent to the leg part 530 supported by the ear (not illustrated) of the wearer and the output diffraction optical device 140 may be disposed in a region S2b adjacent to the support part 520 supported by the nose of the wearer (not illustrated). Accordingly, even though the reducing unit 150 is disposed in a region on the other surface 110b of the light guide unit 110 corresponding to the region, in which the intermediate diffraction optical device 130 is positioned, it is possible to minimize blurring of the wearer's view due to the reducing unit 150.

In the diffraction light guide plates 1100, 2100, and 3100 and/or the display devices 11000, 21000, 31000, 12000, 22000, and 32000 according to the exemplary embodiments of the present invention, even though the light path of the light received from the input diffraction optical device 120 is changed in the vertical direction (the x-axis directions in FIGS. 3, 5, and 7) as the main direction by diffraction by the main intermediate diffraction optical device 131 and the light path of the light, of which the light path is changed, is changed again in the horizontal direction (the y-axis directions in FIGS. 3, 5, and 7) as the main direction by diffraction by the auxiliary intermediate diffraction optical device 132, the main intermediate diffraction optical device 131 and the auxiliary intermediate diffraction optical device 132 are spaced apart from each other in the vertical direction of the light guide unit 110 and particularly, the extension direction of the auxiliary intermediate diffraction optical device 132 is inclined to the extension direction of the main intermediate diffraction optical device 131, so that there is an advantage in that it is possible to decrease the number of times that the light meets the grating lines while travelling, compared to the case where the single intermediate diffraction optical device having the length elongated in the horizontal direction and the width elongated in the vertical direction is used for changing the light paths at least two times. Accordingly, there is an advantage in that it is possible to minimize the deviation of the light path to an unintended path whenever the travelling light meets the grating lines.

Although the present invention has been described in relation to the mentioned exemplary embodiment, various corrections or modifications may be made without departing from the principles or spirit of the invention. Accordingly, as long as the corrections or the modifications belong to the principle of the present invention, the corrections or the modifications may be included in the scope of the accompanying claims.

The invention claimed is:

1. A diffraction light guide plate, comprising:
   a light guide unit configured to guide light;
   an input diffraction optical device configured to receive light from a light source and diffract the received light so that the received light is guided on the light guide unit;
   an intermediate diffraction optical device configured to receive the diffracted light from the input diffraction optical device and allow the received light to be one-dimensionally extended by diffraction; and
   an output diffraction optical device configured to receive the extended light from the intermediate diffraction optical device and allow the received light to be output from the light guide unit by diffraction,
   wherein the intermediate diffraction optical device and the output diffraction optical device are separately disposed in regions divided horizontally on the light guide unit,
   the intermediate diffraction optical device includes a main intermediate diffraction optical device and an auxiliary intermediate diffraction optical device, which are disposed separate apart from each other in a vertical direction on the light guide unit, the main intermediate diffraction optical device is optically coupled to the input diffraction optical device through the light guide unit and directs the diffracted light received from the input diffraction optical device to the auxiliary intermediate diffraction optical device by diffraction, the auxiliary intermediate diffraction optical device is optically coupled to the main intermediate diffraction optical device through the light guide unit and directs the diffracted light received from the main intermediate diffraction optical device to the output diffraction optical device by diffraction, and an extension direction of the auxiliary intermediate diffraction optical device is at an angle toward a lower side of the light guide unit with respect to the extension direction of the main intermediate diffraction optical device.

2. The diffraction light guide plate of claim 1, wherein the main intermediate diffraction optical device has a diffraction ratio, which is a value obtained by dividing amount of diffracted light by amount of light before diffraction, gradually increasing from one side to the other side in the extension direction of the main intermediate diffraction optical device.

3. The diffraction light guide plate of claim 1, wherein the auxiliary intermediate diffraction optical device has the same diffraction ratio, which is a value obtained by dividing amount of diffracted light by amount of light before diffraction, from one side to the other side in the extension direction of the auxiliary intermediate diffraction optical device.

4. The diffraction light guide plate of claim 3, wherein the diffraction ratio, which is a value obtained by dividing amount of diffracted light by amount of light before diffraction, of the auxiliary intermediate diffraction optical device is larger than a maximum diffraction ratio of the main intermediate diffraction optical device.

5. The diffraction light guide plate of claim 1, wherein the intermediate diffraction optical device is disposed at one surface side of the light guide unit, and a reducing unit for reducing the reception ratio of external light, other than the light output from the light source, is disposed in a region corresponding to a region, in which the intermediate diffraction optical device is positioned, at one surface side or the other surface side of the light guide unit.

6. The diffraction light guide plate of claim 1, wherein a plurality of auxiliary intermediate diffraction optical devices is provided so as to be disposed while being spaced apart from each other in a vertical direction on the light guide unit, and a first auxiliary intermediate diffraction optical device, which is adjacently disposed to the main intermediate diffraction optical device between the plurality of auxiliary intermediate diffraction optical devices, is optically coupled to the main intermediate diffraction optical device through the light guide unit and directs the diffracted light received from the main intermediate diffraction optical device to the output diffraction optical device by diffraction, and a second auxiliary intermediate diffraction optical device, which is adjacently disposed to the first auxiliary intermediate diffraction optical device, is optically coupled to the first auxiliary intermediate diffraction optical device through the light guide unit, and receives light which is not diffracted to the output diffraction optical device by the first auxiliary intermediate diffraction optical device and directs the received light to the output diffraction optical device by diffraction.

7. The diffraction light guide plate of claim 6, wherein an extension direction of the first auxiliary intermediate diffraction optical device is parallel to an extension direction of the second auxiliary intermediate diffraction optical device.

8. The diffraction light guide plate of claim 6, wherein a diffraction ratio, which is a value obtained by dividing amount of diffracted light by amount of light before diffraction, of the second auxiliary intermediate diffraction optical device is larger than a diffraction ratio of the first auxiliary intermediate diffraction optical device.

9. The diffraction light guide plate of claim 1, wherein a plurality of auxiliary intermediate diffraction optical devices is provided so as to be disposed while being spaced apart from each other in a vertical direction on the light guide unit, and a first auxiliary intermediate diffraction optical device, which is adjacently disposed to the main intermediate diffraction optical device between the plurality of auxiliary intermediate diffraction optical devices, is optically coupled to the main intermediate diffraction optical device through the light guide unit, and receives a part of the diffracted light from the main intermediate diffraction optical device and directs the received part of the diffracted light to the output diffraction optical device by diffraction, and a second auxiliary intermediate diffraction optical device, which is adjacently disposed to the first auxiliary intermediate diffraction optical device, is optically coupled to the main intermediate diffraction optical device through the light guide unit, and receives at least a part of the diffracted light, which is not received by the first auxiliary intermediate diffraction optical device, from the main intermediate diffraction optical device, and directs the received light to the output diffraction optical device by diffraction.

10. The diffraction light guide plate of claim 9, wherein a width of the second auxiliary intermediate diffraction optical device in a direction crossing an extension direction of the second auxiliary intermediate diffraction optical device is larger than a width of the first auxiliary intermediate diffraction optical device.

11. The diffraction light guide plate of claim 9, wherein an extension direction of the first auxiliary intermediate diffraction optical device is parallel to an extension direction of the second auxiliary intermediate diffraction optical device.

12. A display device, comprising:
a light source configured to output image light forming an image; and
the diffraction light guide plate according to claim 1.

* * * * *